United States Patent
Snyder

(10) Patent No.: US 12,448,057 B1
(45) Date of Patent: Oct. 21, 2025

(54) FOLDING CABIN ASSEMBLY FOR LOW VELOCITY AIR DROP

(71) Applicant: Oshkosh Corporation, Oshkosh, WI (US)

(72) Inventor: Timothy Snyder, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 375 days.

(21) Appl. No.: 17/967,631

(22) Filed: Oct. 17, 2022

Related U.S. Application Data

(60) Provisional application No. 63/256,747, filed on Oct. 18, 2021.

(51) Int. Cl.
| | |
|---|---|
| *B60J 7/00* | (2006.01) |
| *B62D 33/063* | (2006.01) |
| *B64D 1/02* | (2006.01) |
| *F41H 7/02* | (2006.01) |

(52) U.S. Cl.
CPC .......... *B62D 33/063* (2013.01); *B60J 7/0053* (2013.01); *B64D 1/02* (2013.01); *F41H 7/02* (2013.01)

(58) Field of Classification Search
CPC ........ B62D 33/063; B60J 7/0053; B64D 1/02; F41H 7/02
USPC ...................................................... 296/26.01
See application file for complete search history.

(56) References Cited

U.S. PATENT DOCUMENTS

| | | | | |
|---|---|---|---|---|
| 3,397,007 | A | * | 8/1968 | Scheid ...................... B60P 3/34 296/170 |
| 2008/0017426 | A1 | * | 1/2008 | Walters ................... B60F 3/003 296/193.04 |
| 2009/0256383 | A1 | * | 10/2009 | Bruder ................... B60J 7/1265 296/108 |
| 2016/0375805 | A1 | | 12/2016 | Krueger et al. |
| 2020/0247486 | A1 | | 8/2020 | Groteleuschen et al. |
| 2020/0256649 | A1 | | 8/2020 | Krueger et al. |
| 2022/0260344 | A1 | | 8/2022 | Krueger et al. |

FOREIGN PATENT DOCUMENTS

| | | | | | |
|---|---|---|---|---|---|
| CH | 639324 | A5 | * | 11/1983 | |
| CN | 200949269 | Y | * | 9/2007 | |
| CN | 200992245 | Y | * | 12/2007 | |
| CN | 204296890 | U | * | 4/2015 | |
| CN | 206623900 | U | * | 11/2017 | |
| CN | 206721971 | U | * | 12/2017 | |
| CN | 109109876 | A | * | 1/2019 | ............ B61B 13/04 |
| CN | 112124183 | A | * | 12/2020 | |
| CN | 212336320 | U | * | 1/2021 | |
| CN | 218912450 | U | * | 4/2023 | |
| CN | 219214994 | U | * | 6/2023 | |
| CN | 118223367 | A | * | 6/2024 | ............ E01C 19/48 |

(Continued)

*Primary Examiner* — Hilary L Gutman
(74) *Attorney, Agent, or Firm* — Foley & Lardner LLP

(57) ABSTRACT

A military vehicle includes a cabin. The cabin includes a bottom assembly and a foldable top assembly. The bottom assembly is configured to receive and removably couple with different top assemblies. The foldable top assembly is configured to transition between a folded position for a low velocity aerial drop (LVAD) and a deployed position. The foldable top assembly includes a torsional spring configured to provide a torque to assist transitioning of the foldable top assembly from the folded position to the deployed position.

19 Claims, 27 Drawing Sheets

(56) References Cited

FOREIGN PATENT DOCUMENTS

| | | | | | |
|---|---|---|---|---|---|
| CN | 119239780 | A | * | 1/2025 | |
| DE | 202021104573 | U1 | * | 12/2021 | |
| DE | 102020130653 | A1 | * | 5/2022 | |
| EP | 2166154 | A2 | * | 3/2010 | ............ B60J 7/1628 |
| FR | 2557040 | A | * | 6/1985 | ................ B60J 1/02 |
| GB | 2454061 | A | * | 4/2009 | ................ B60P 3/34 |
| JP | S6120133 | Y2 | * | 6/1986 | |
| JP | H0532261 | U | * | 4/1993 | |

* cited by examiner

FOLDING CABIN ASSEMBLY FOR LOW VELOCITY AIR DROP

CROSS-REFERENCE TO RELATED PATENT APPLICATION

This application claims the benefit of and priority to U.S. Provisional Application No. 63/256,747, filed Oct. 18, 2021, the entire disclosure of which is incorporated by reference herein.

BACKGROUND

The present disclosure relates to cabin assemblies. More particularly, the present disclosure relates to cabin assemblies for armored vehicles.

SUMMARY

One implementation of the present disclosure is a military vehicle, according to some embodiments. In some embodiments, the military vehicle includes a cabin. In some embodiments, the cabin includes a bottom assembly and a foldable top assembly. In some embodiments, the bottom assembly is configured to receive and removably couple with different top assemblies. In some embodiments, the foldable top assembly is configured to transition between a folded position for a low velocity aerial drop (LVAD) and a deployed position. In some embodiments, the foldable top assembly includes a torsional spring configured to provide a torque to assist transitioning of the foldable top assembly from the folded position to the deployed position.

In some embodiments, the transitioning of the foldable top assembly from the folded position to the deployed position is manually initiated and the torsional spring is configured to provide the torque to transition the foldable top assembly at least partially out of the folded position. In some embodiments, the foldable top assembly includes a torsional bar assembly including the torsional spring. In some embodiments, a housing of the torsional spring includes an interface configured to couple with a tool to provide supplemental torque to manually transition the foldable top assembly fully into the deployed position.

In some embodiments, the torsional spring is configured to exert a torque between the bottom assembly and a rear wall of the foldable top assembly. In some embodiments, the foldable top assembly includes multiple support members that are rotatably coupled with the bottom assembly at a first end and rotatably coupled with a roof of the foldable top assembly at a second end. In some embodiments, the support members, the roof of the foldable top assembly, and the bottom assembly form a four-bar linkage.

In some embodiments, the support members include an end having a shoulder configured to abut a portion or member of the foldable top assembly that couples with the bottom assembly, the shoulder defining a flat surface. In some embodiments, the flat surface and the shoulder are configured to limit further rotation of the plurality of support members beyond an angular position of the plurality of support members when the foldable top assembly is in the deployed position.

Another implementation of the present disclosure is a foldable cabin assembly for a military vehicle, according to some embodiments. In some embodiments, the foldable cabin assembly includes a bottom frame assembly, a roof, multiple elongated members, and a torsion bar assembly. In some embodiments, the bottom frame assembly is configured to rest upon and removably couple with a bottom assembly of the military vehicle. In some embodiments, the elongated members extend between the bottom frame assembly and the roof. In some embodiments, the elongated members are rotatably coupled with the bottom frame assembly and the roof at opposite ends. In some embodiments, the torsion bar assembly is configured to exert a torque on at least one of the elongated members to facilitate transitioning the foldable cabin assembly from a folded position to a deployed position by rotating the plurality of elongated members in the first direction.

In some embodiments, at least one of the elongated members include an end having a shoulder configured to abut a top surface of the bottom frame assembly. In some embodiments, the shoulder defines a flat surface. In some embodiments, the flat surface and the shoulder are configured to limit further rotation of the support members beyond an angular position of the elongated members when the foldable cabin assembly is in the deployed position.

In some embodiments, the angular position of the elongated members when the foldable cabin assembly is in the deployed position is a second angular position. In some embodiments, the at least one of the plurality of elongated members that includes the shoulder is selectably pinned in a first angular position when the foldable cabin assembly is in the folded position, and the second angular position when the foldable cabin assembly is in the deployed position.

In some embodiments, the bottom frame assembly, the roof, and the elongated members form a four-bar linkage. In some embodiments, the support members are configured to extend in a vertical direction when in the deployed position.

In some embodiments, the foldable cabin assembly further includes cuttable straps. In some embodiments, the cuttable straps are configured to maintain the foldable cabin assembly in the folded position and counter the torque exerted by the torsion bar assembly. In some embodiments, the torsion bar assembly is configured to automatically drive the elongated members to rotate to a position between the folded position and the deployed position when the cuttable straps are cut.

In some embodiments, the torsion bar assembly is configured to automatically drive the elongated members to rotate to a position between the folded position and the deployed position responsive to initiation of transition of the foldable cabin assembly from the folded position to the deployed position. In some embodiments, the torsion bar assembly is configured to provide additional torque to aid a manually input torque resulting from a manual force applied to the elongated members. In some embodiments, the manual force required to be applied to the elongated members to fully transition the foldable cabin assembly into the deployed position does not exceed 40 lbf.

In some embodiments, the elongated members are configured to rotate at least 80 degrees between the folded position and the deployed position of the foldable cabin assembly. In some embodiments, the foldable cabin assembly further includes multiple support members. In some embodiments, the support members are rotatably coupled at their first ends with the bottom frame assembly. In some embodiments, the support members are configured to be rotated into position and fixedly coupled at their second ends with the roof or an upper end of the elongated members that couples with the roof when the foldable cabin assembly is in the deployed position. In some embodiments, the support members are configured to provide structural support for the roof and limit transition of the foldable cabin assembly out of the deployed position when fixedly coupled at their second ends with the roof or the upper end of the plurality of elongated members.

In some embodiments, a housing of a torsional spring of the torsion bar assembly includes an interface configured to couple with a tool to provide torque to manually transition the foldable cabin fully into the deployed position. In some embodiments, at least one of the roof, the bottom frame assembly, or the elongated members are configured to receive and couple with panels when the foldable cabin assembly is in the deployed position. In some embodiments, at least one of the roof, the bottom frame assembly, or the elongated members are configured to receive and couple with weapons mounts or shelving units when the foldable cabin assembly is in the deployed position.

Another implementation of the present disclosure is a method for delivering and configuring a military vehicle for use, according to some embodiments. In some embodiments, the method includes performing a low velocity aerial drop (LVAD) of the military vehicle from an airborne aircraft to physically drop the military vehicle to a ground location. In some embodiments, the military vehicle includes a foldable cabin assembly. In some embodiments, the foldable cabin assembly is in a folded position when transported in the aircraft and when physically dropped to the ground location. In some embodiments, the method includes removing one or more straps that maintain the foldable cabin assembly in the folded position. In some embodiments, the method includes driving the foldable cabin assembly into a position partially between the folded position and a deployed position by providing a torque with a torsional spring. In some embodiments, the method includes providing a force that is less than 40 lbf to the foldable cabin assembly to manually drive the foldable cabin assembly into the deployed position. In some embodiments, the torsional spring provides assisting torque to reduce the force required to manually dive the foldable cabin assembly into the deployed position. In some embodiments, a pin of a support member of the foldable cabin assembly is configured to be driven into an opening of the foldable cabin assembly to lock the foldable cabin assembly in the deployed position. In some embodiments, the method includes installing a brace onto the foldable cabin assembly to limit transition of the foldable cabin assembly out of the deployed position and into the folded position. In some embodiments, the method includes installing panels, armored plates, doors, and mirrors onto the foldable cabin.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Overview

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, a vehicle includes a cabin that has an interchangeable top assembly. The cabin may include a bottom assembly that is universal or is configured for use with both a fixed top assembly and a folding top assembly. The folding top assembly can include different linkages that form a four bar linkage system or a similar linkage system, and a torsional spring that is configured to drive the linkage system to unfold. The folding top can be transitioned between a folded configuration and a deployed or unfolded configuration. The vehicle may include the cabin with the folding top assembly in the folded configuration for an aerial drop out of an aircraft. Once the vehicle lands on the ground, the folding top assembly can be transitioned into the deployed or unfolded configuration, and support beams, mirrors, panels, etc., may be installed onto the folding top assembly. The folding top assembly can also be removed and replaced with the fixed top assembly.

Figure 1:
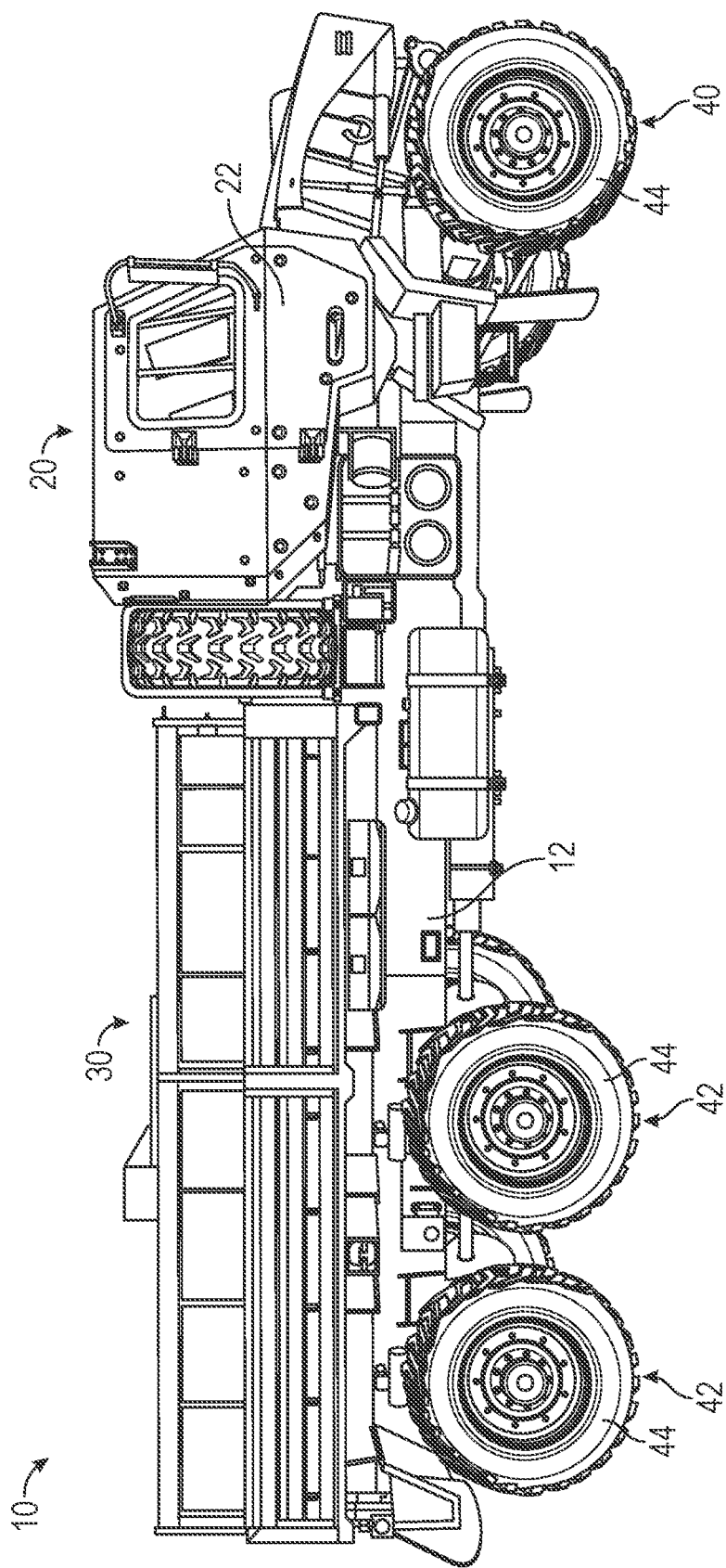
FIG. 1 is a side view of a vehicle, according to an exemplary embodiment.

According to the exemplary embodiment shown in FIG. 1, a vehicle, shown as vehicle 10, includes a chassis, shown as frame 12, that supports a body assembly including a first portion, shown as front cabin 20, and a second portion, shown as mission equipment 30. As shown in FIG. 1, the mission equipment 30 is disposed behind the front cabin 20. The frame 12 of the vehicle 10 engages a plurality of tractive assemblies, shown as front tractive assemblies 40 and rear tractive assemblies 42. According to an exemplary embodiment, the vehicle 10 is a military ground vehicle. In other embodiments, the vehicle 10 is an off-road vehicle such as a utility task vehicle, a recreational off-highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, and/or still another vehicle.

According to an exemplary embodiment, the frame 12 defines a longitudinal axis. The longitudinal axis may be generally aligned with a frame rail of the frame 12 of the vehicle 10 (e.g., front-to-back, etc.). In some embodiments, the vehicle 10 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 1, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.).

According to an exemplary embodiment, the front cabin 20 includes one or more doors, shown as doors 22, that facilitate entering and exiting an interior of the front cabin 20. The interior of the front cabin 20 may include a plurality of seats (e.g., two, three, four, five, etc.), vehicle controls, driving components (e.g., steering wheel, accelerator pedal, brake pedal, etc.), etc. According to the exemplary embodiment shown in FIG. 1, the mission equipment 30 includes a cargo body configured to facilitate transporting various military equipment (e.g., medical supplies, ammunition, weapons, missiles, personnel, etc.). In other embodiments, the mission equipment 30 includes a truck bed or a flat bed. In some embodiments, the mission equipment 30 additionally or alternatively includes a boom lift. In another embodiment, the mission equipment 30 includes an at least partially enclosed troop transport cabin configured to facilitate transporting troops (e.g., eight, ten, twelve, twenty, etc.) with the vehicle 10.

According to an exemplary embodiment, the vehicle 10 includes a powertrain system. The powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or moves the vehicle 10. In such embodiments, the vehicle 10 may not include the generator and/or the energy storage device. The powertrain of the vehicle 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, hydrogen, electricity, etc.).

Front Cabin

Figure 2:
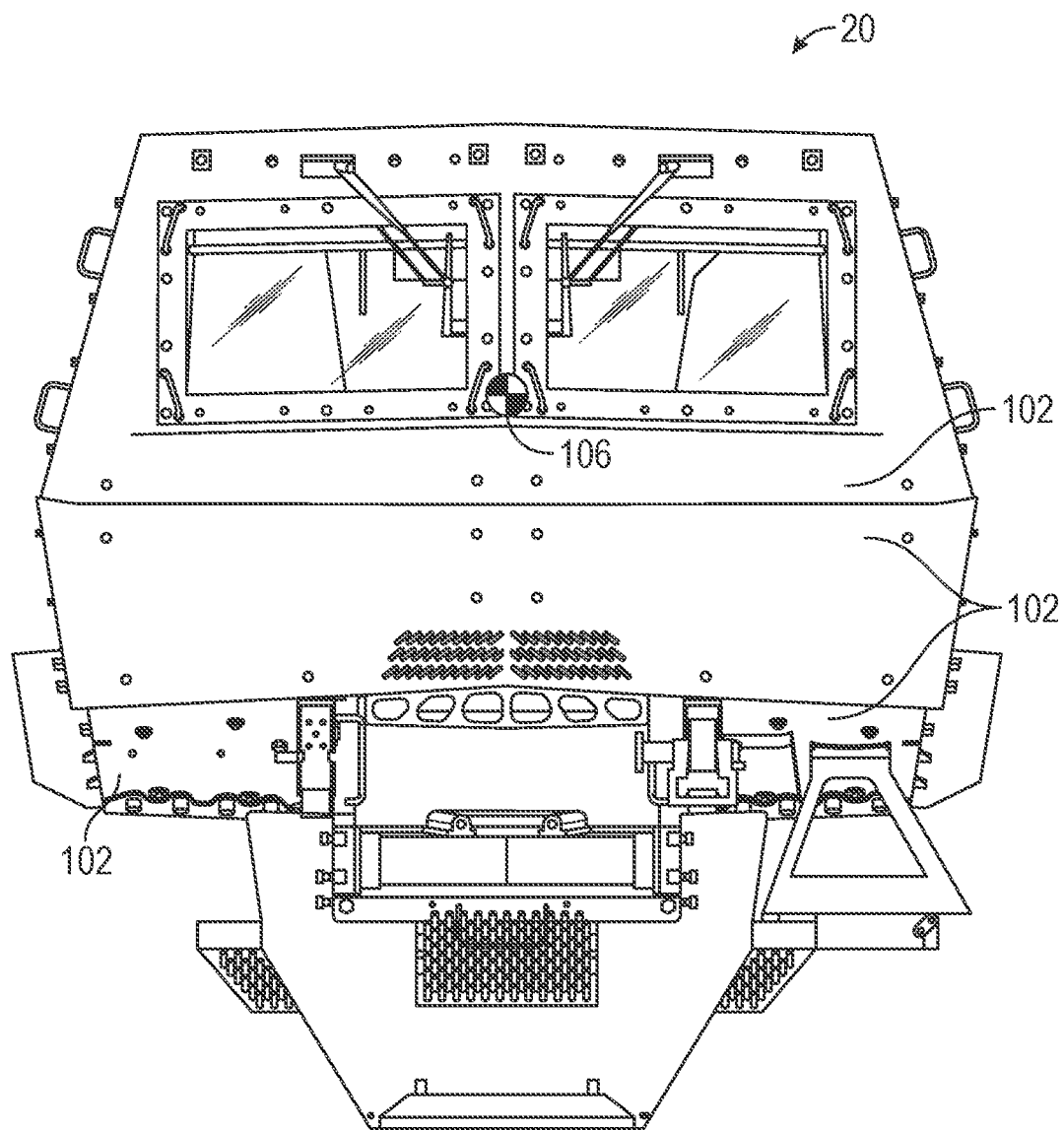
FIG. 2 is a front view of a front cabin of the vehicle of FIG. 1, according to an exemplary embodiment.
Figure 3:
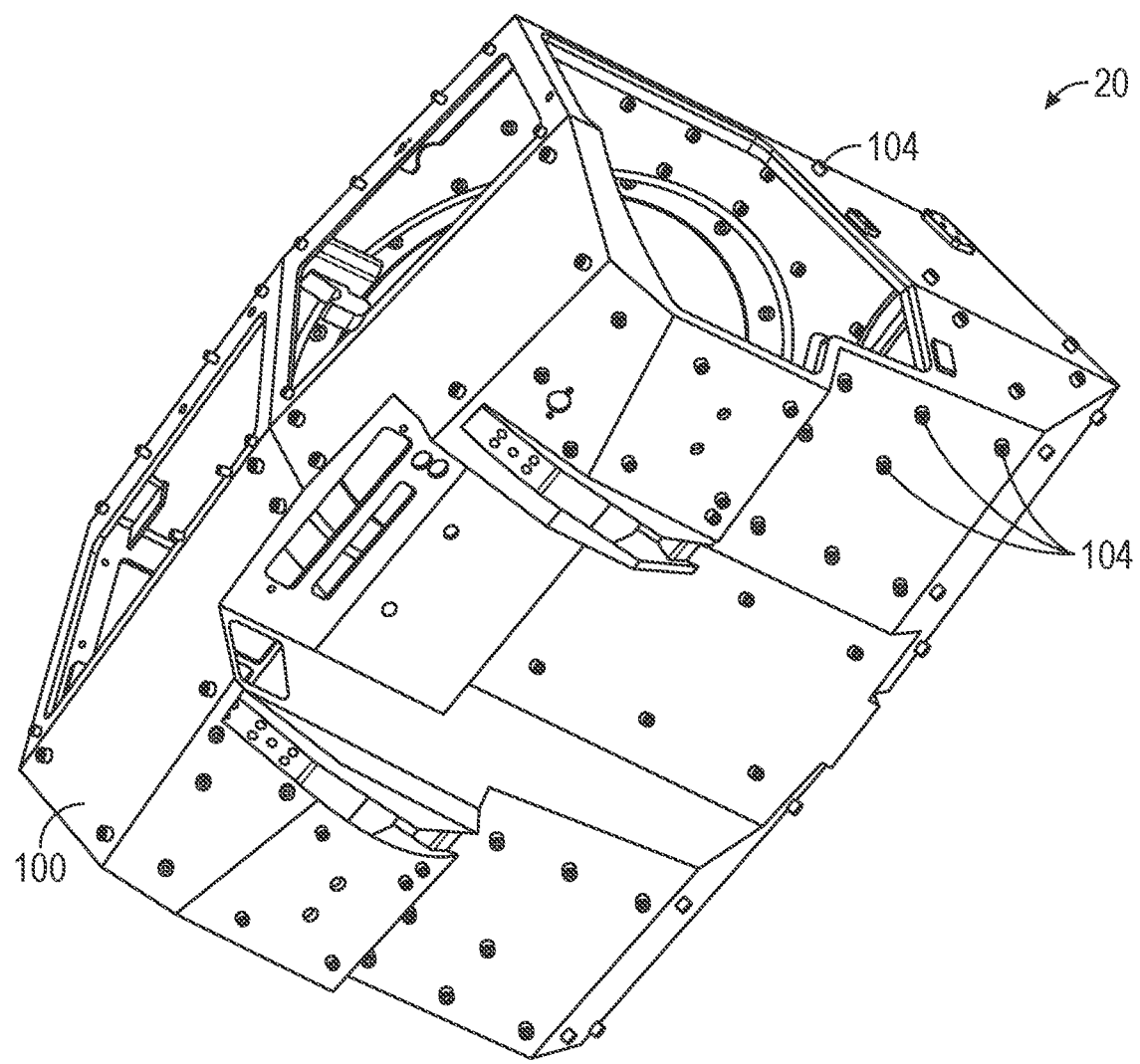
FIG. 3 is a bottom perspective view of the front cabin of FIG. 2.
Figure 4:
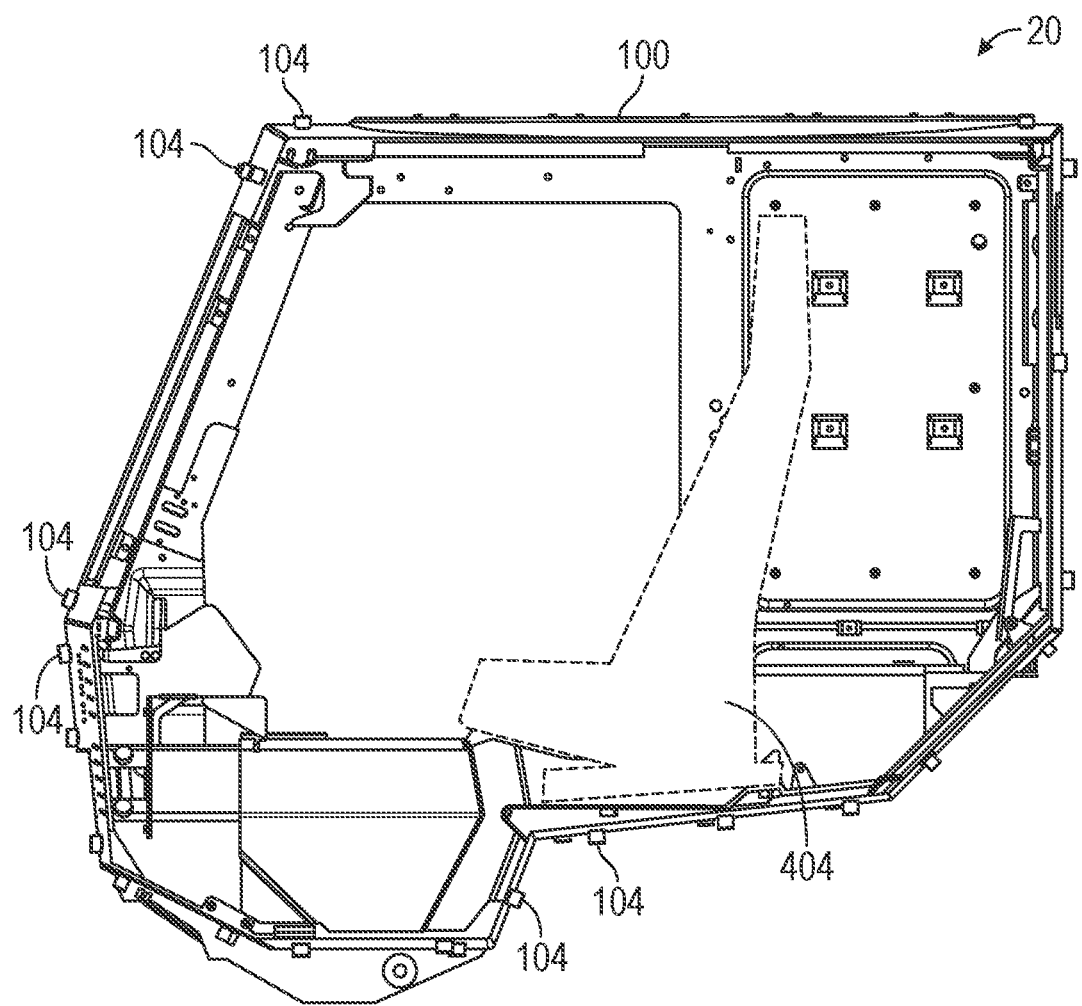
FIG. 4 is a side section view of the front cabin of FIG. 2.

Referring to FIGS. 2-4, the front cabin 20 is shown. The front cabin 20 is configured to contain one or more occupants (e.g., drivers, passengers, gunners, etc.). The front cabin 20 may be reconfigured between an armored configuration and an unarmored configuration. With the front cabin 20 in the unarmored configuration, the vehicle 10 is configured to operate in an environment with minimal risk of a blast event (e.g., explosion) occurring. In the armored configuration, the front cabin 20 is more heavily armored to afford a greater degree of protection to the occupants during a blast event. The front cabin 20 includes a support structure, shown as frame 100. In changing between the unarmored and armored configurations, one or more armor panels 102 may be coupled to the frame 100. In some embodiments, the armor panels 102 are coupled to the frame 100 through protrusions, shown as appurtenances 104, extending outward from the frame 100. The appurtenances 104 may be located on some or all outer surfaces of the frame 100, including the underside. The appurtenances 104 may be threaded to accept bolts that pass through the armor panels 102, coupling the armor panels 102 to the frame 100. The appurtenances 104 may be fixedly coupled (e.g., welded) to the frame 100 to facilitate assembly. Coupling the appurtenances 104 to the frame 100 when initially assembling the vehicle 10 may facilitate more consistent installation of the armor panels 102 than a conventional vehicle where the armor panels are welded to the vehicle after the initial assembly. Given that the armor panels 102 are not present in the unarmored configuration, the front cabin 20 may be substantially lighter in the unarmored configuration than in the armored configuration. The frame 100 may be reinforced to support the weight of the armor panels 102. Referring to FIG. 2, a center of gravity 106 of the front cabin 20 is shown. The center of gravity 106 may be approximately laterally centered along the front cabin 20.

Modular Cabin Assembly

Figure 5:
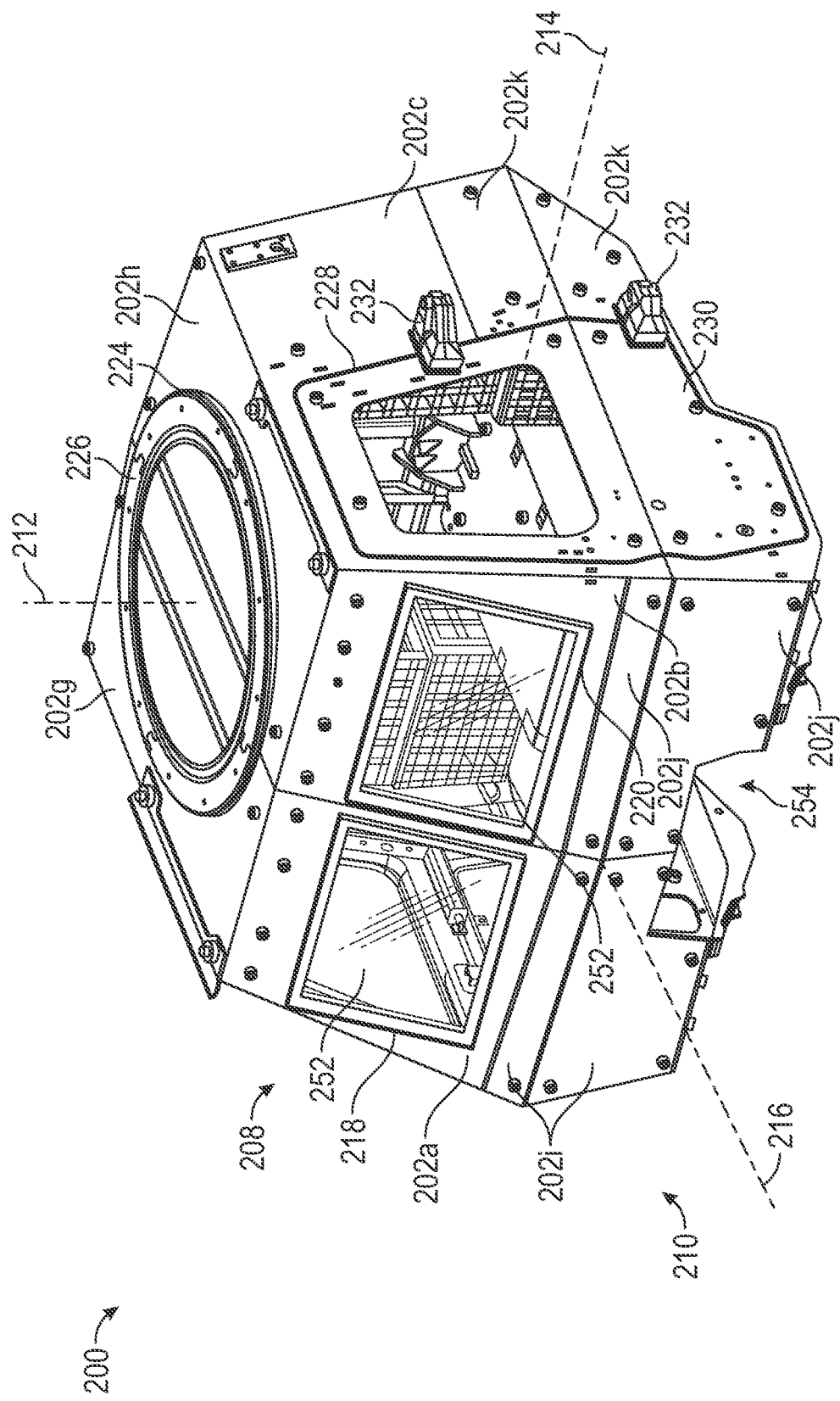
FIG. 5 is a perspective view of a cabin for the vehicle of FIG. 1 including a fixed top assembly that is removably coupled with a bottom assembly.
Figure 6:
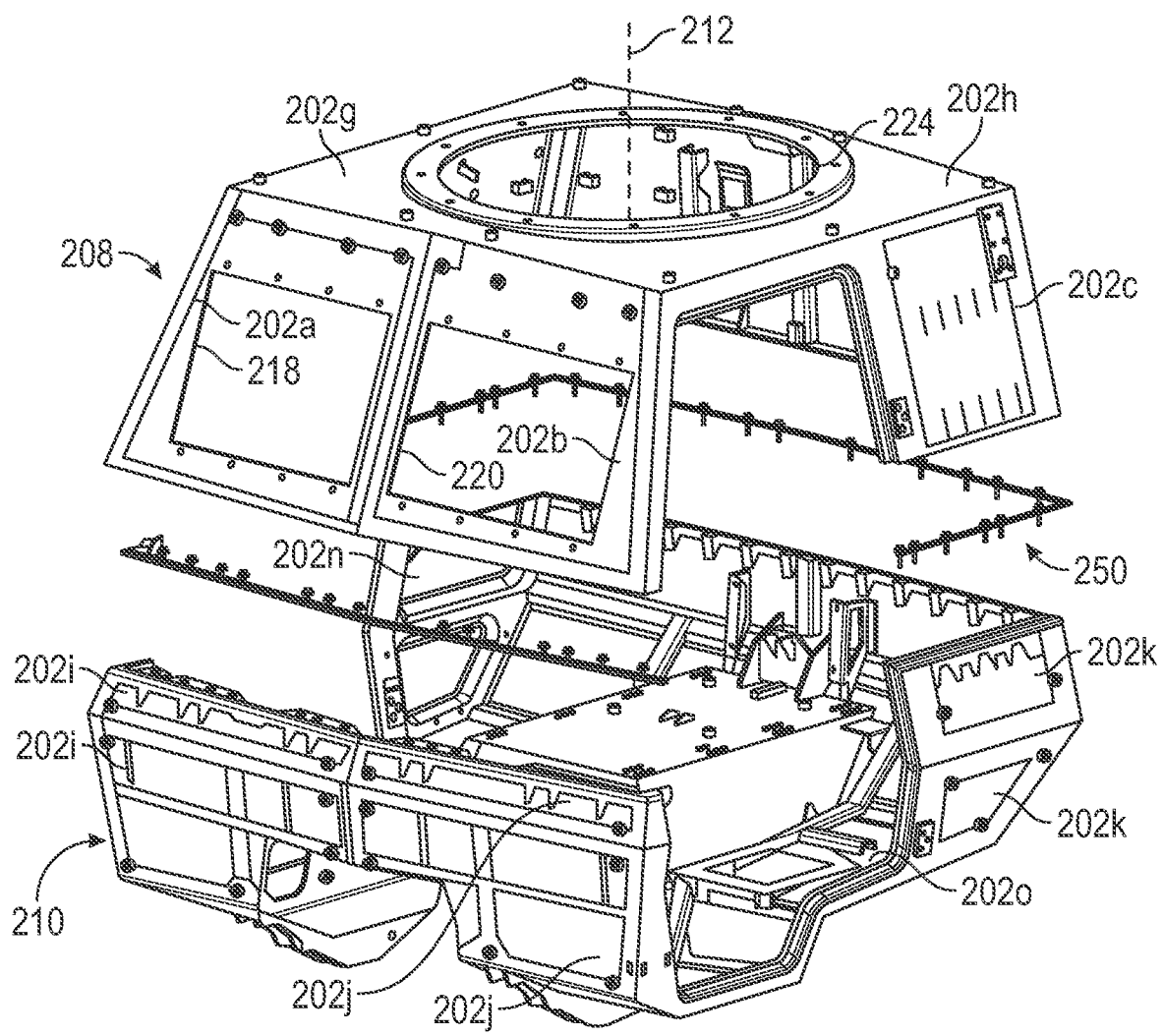
FIG. 6 is an exploded perspective view of the cabin of FIG. 5.
Figure 7:
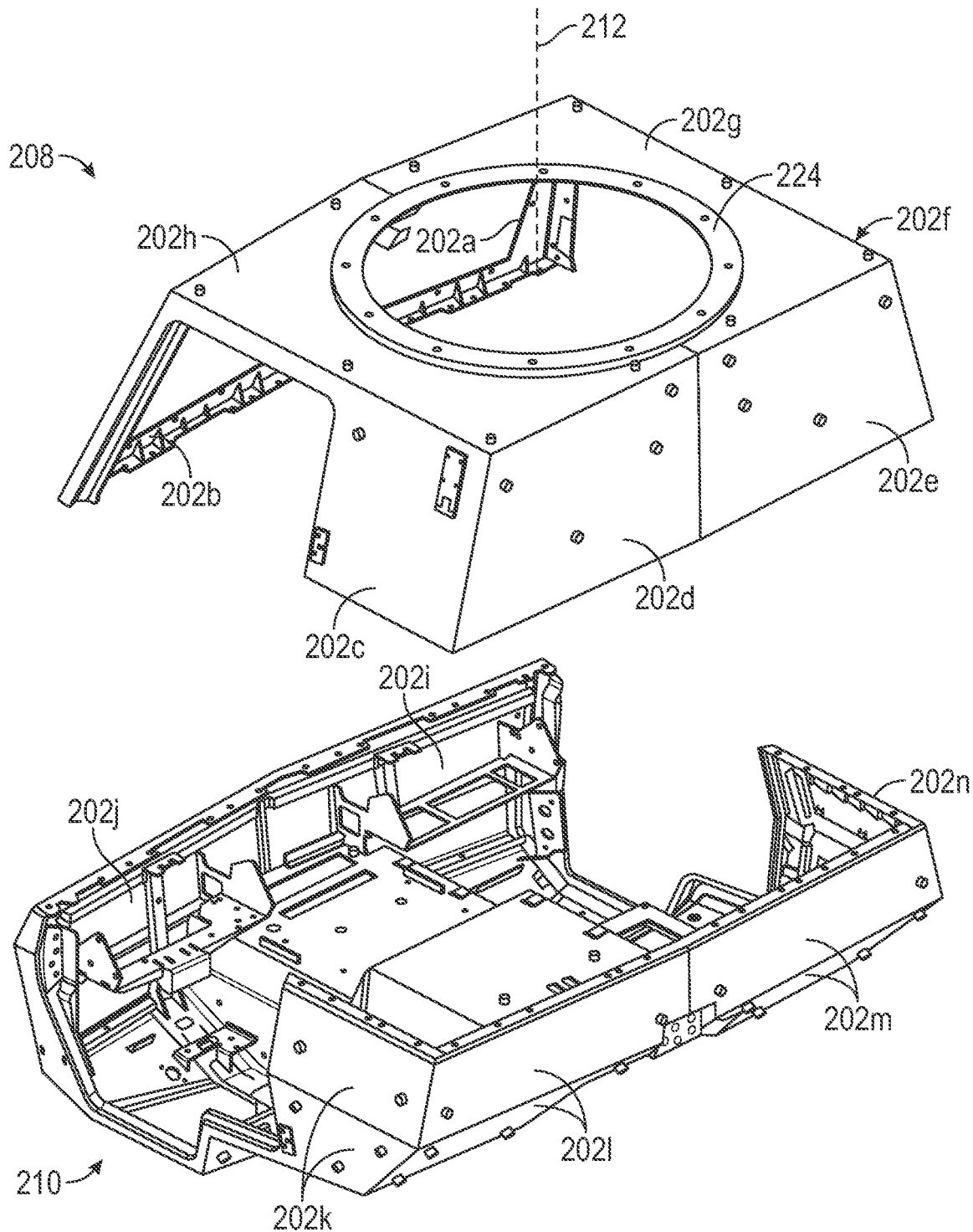
FIG. 7 is an exploded perspective view of the cabin of FIG. 5.

As shown in FIGS. 5-7, a cabin 200 with a removable top assembly 208 (e.g., an upper structure, an upper shell, a hard top, an armored body, etc.) and a bottom assembly 210 (e.g., a lower structure, a lower shell, a bottom, an armored body, etc.), according to an exemplary embodiment. The removable top assembly 208 can be selectably or removably coupled with the bottom assembly 210 so that the top assembly 208 can be interchanged with a different top assembly to thereby form a different cabin 200 (e.g., a folding top cabin).

The cabin 200 includes a seal 250 (e.g., a rubber insert, a fastening member, an elongated member, a perimeter member, etc.) positioned between the top assembly 208 and the bottom assembly 210. The seal 250 is configured to directly contact a corresponding portion of both the top assembly 208 and the bottom assembly 210. The seal 250 may include fasteners that are configured to interface, interlock, couple, etc., with corresponding tabs, protrusions, surfaces, edges, etc., of the top assembly 208 and the bottom assembly 210.

The cabin 200 defines a longitudinal axis 216, a lateral axis 214, and a vertical axis 212. The cabin 200 can be disposed on the vehicle 10 in place of the front cabin 20. The cabin 200 may be coupled with the frame 12 of the vehicle 10 similarly to the front cabin 20. The cabin 200 can be provided as a modular assembly of the top assembly 208 and the bottom assembly 210. In some embodiments, each of the top assembly 208 and the bottom assembly 210 are individually modular, formed or defined by different modular components, units, panels, frame members, etc. As shown in FIG. 5, the top assembly 208 and the bottom assembly 210 are configured to cooperatively define an interior when assembled. The interior can include seats, weaponry, weapon mounts, storage, etc.

As shown in FIGS. 5-7, the cabin 200 includes a pair of doors 230 positioned on opposite lateral sides of the cabin 200. The doors 230 are hingedly coupled with the opposite lateral sides of the cabin 200 through hinges 232. The doors 230 are transitionable between a closed position (shown in FIG. 5) and an open position to facilitate access to the interior of the cabin 200. In an exemplary embodiment, the doors 230 have a shape that matches or corresponds to a shape of door openings that are cooperatively defined by the top assembly 208 and the bottom assembly 210. The doors 230 can include a seal or a projectile catching perimeter to reduce a likelihood of projectiles penetrating the opposite lateral sides of the cabin 200. The doors 230 may include window openings and windows (e.g., glass, bullet proof clear material, opaque material, selectively tintable windows, etc.), to facilitate viewing an exterior of the cabin 200 from the interior of the cabin 200 (e.g., by one or more occupants or operators of the cabin 200).

As shown in FIGS. 5-7, the top assembly 208 includes panels 202a-202h that cooperatively define the top assembly 208 (e.g., a shell of the top assembly 208). Specifically, the panels 202a-202g include a first front panel 202a, a second front panel 202b, a first side panel 202c, a first rear panel 202d, a second rear panel 202e, a second side panel 202f, a first top panel 202g, and a second top panel 202h. The first front panel 202a and the second front panel 202b cooperatively define a longitudinal front of the top assembly 208. The first rear panel 202d and the second rear panel 202e cooperatively define a longitudinal rear of the top assembly 208. The first side panel 202c defines a first lateral side of the top assembly 208. The second side panel 202f defines a second lateral side of the top assembly 208. The first top panel 202g and the second top panel 202h define a vertical top that defines a roof of the cabin 200.

As shown in FIGS. 5-7, the bottom assembly 210 includes at least panels 202i-202o. The panels 202i-202n cooperatively define the bottom assembly 210. Specifically, the panels 202i-202n include a front panels 202i, front panels 202j, side panels 202k, rear panels 202l rear panels 202m, side panels 202n, and bottom panels 202o. In some embodiments, front panels 202i and the front panels 202j cooperatively define a longitudinal front of the bottom assembly 210. The rear panels 202l and the rear panels 202m cooperatively define a longitudinal rear or rear surface(s) of the bottom assembly 210. The side panels 202k and the side panels 202n define opposite lateral sides of the bottom assembly 210. The bottom panels 202o define a bottom or floor of the bottom assembly 210 and also define a tunnel 254 (e.g., a depression or channel in the floor extending in substantially in a direction parallel with the longitudinal axis 216). The tunnel 254 is configured to receive a corresponding portion of the frame 12 for coupling the cabin 200 with the frame 12 (e.g., fastening).

The bottom assembly 210 and the top assembly 208 cooperatively define openings 228 (e.g., apertures, windows, etc.) on either lateral sides of the cabin 200 that corresponds to a shape of the doors 230. The doors 230 can have a shape that corresponds to or matches the relative angles and orientations of the side panels 202k and the side panels 202c (or similarly the side panels 202n and the side panels 202f).

The top panels 202h and 202g of the top assembly 208 cooperatively define an opening, an aperture, a hole, an access window, etc., shown as opening 224. The opening 224 can be a circular opening. The opening 224 defines an access point for access to the interior of the cabin 200 or for mounting weaponry. The opening 224 is configured to be sealed to limit access to the interior of the cabin 200 with a plate 226 (e.g., a panel, a plate, a planar member, a lid, etc.).

Folding Top Assembly

Figure 8:
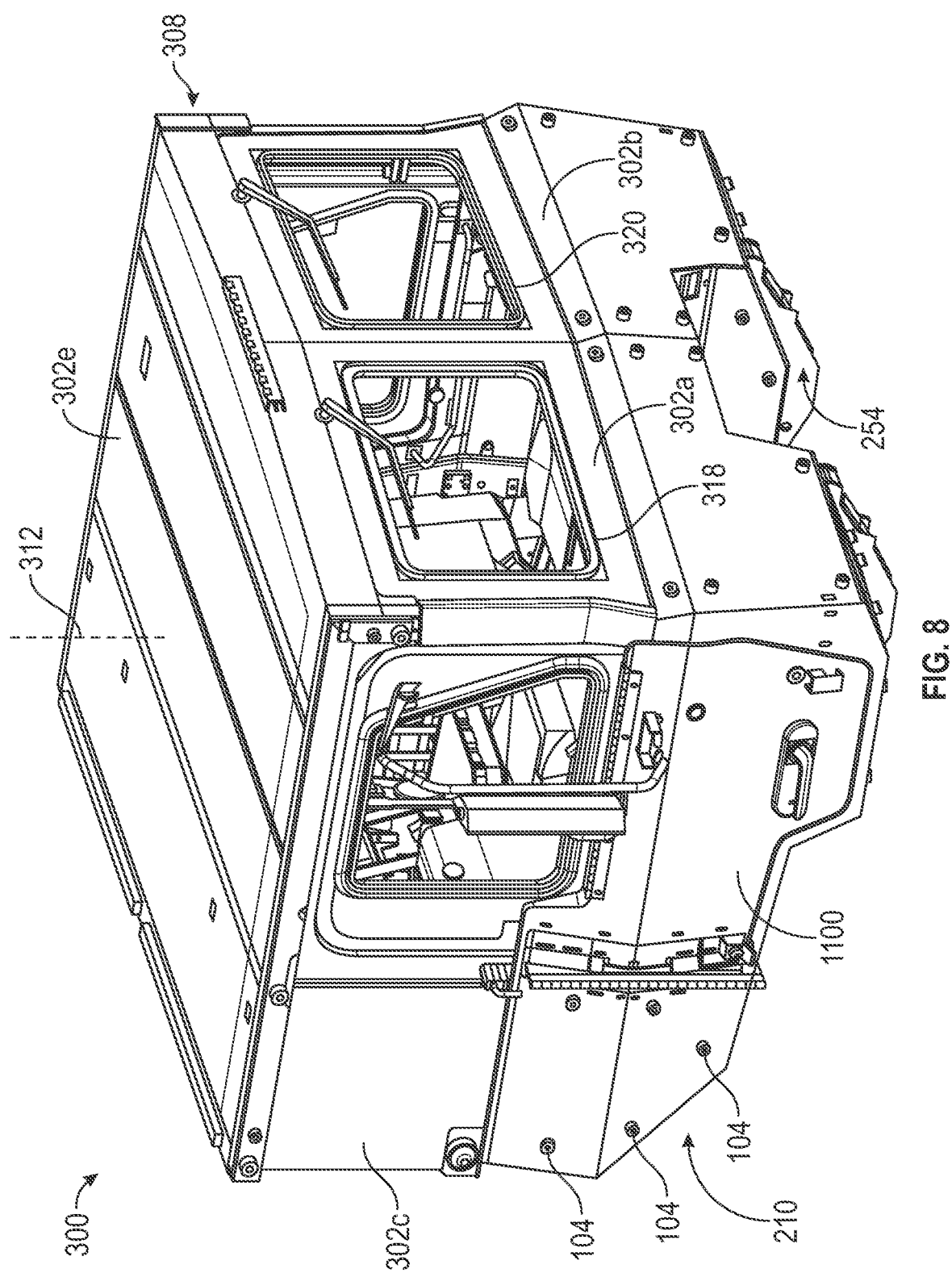
FIG. 8 is a perspective view of a foldable cabin with a foldable top assembly installed on the bottom assembly of the cabin of FIG. 5.
Figure 9:
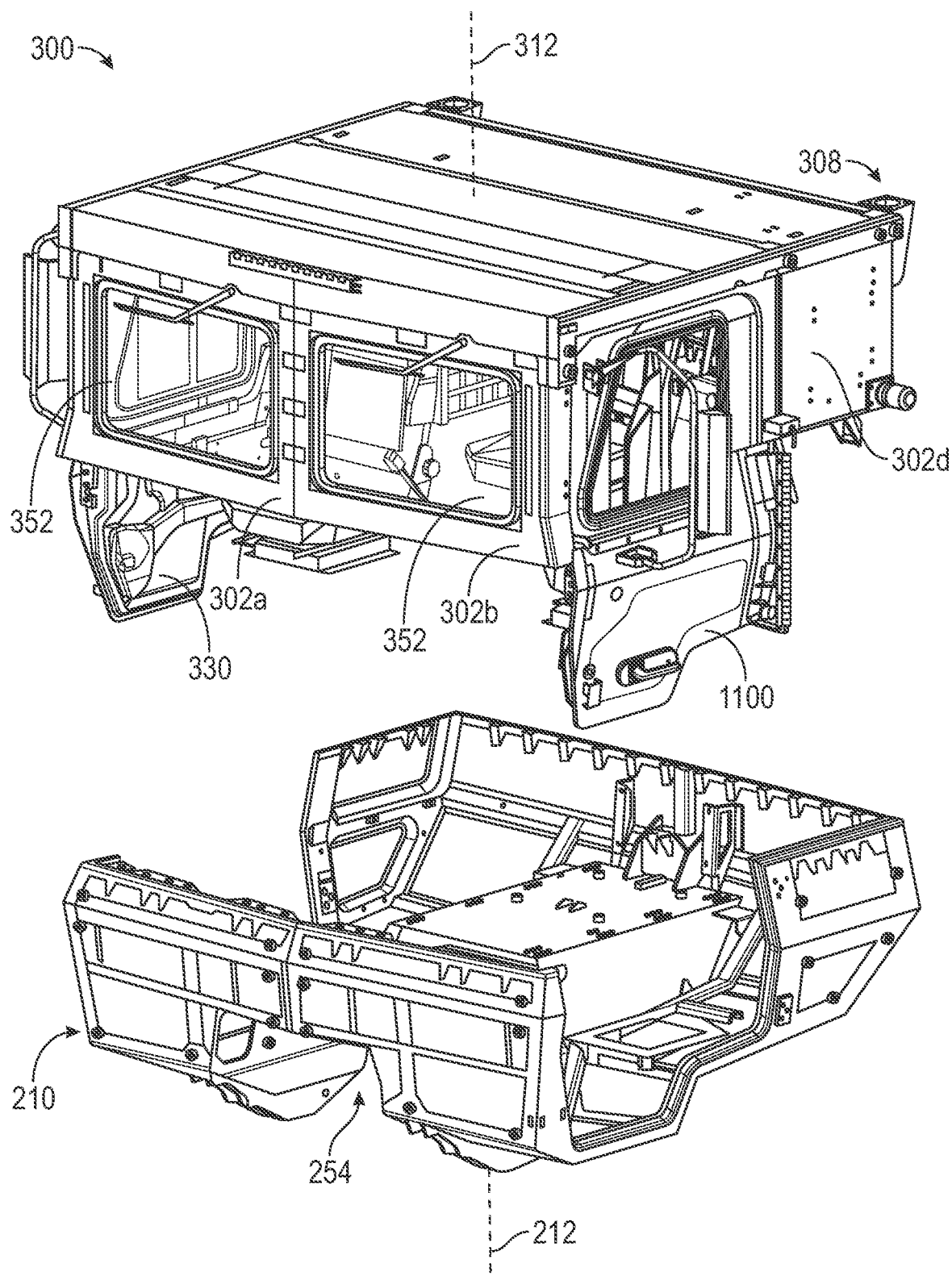
FIG. 9 is an exploded perspective view of the foldable cabin of FIG. 8.
Figure 10:
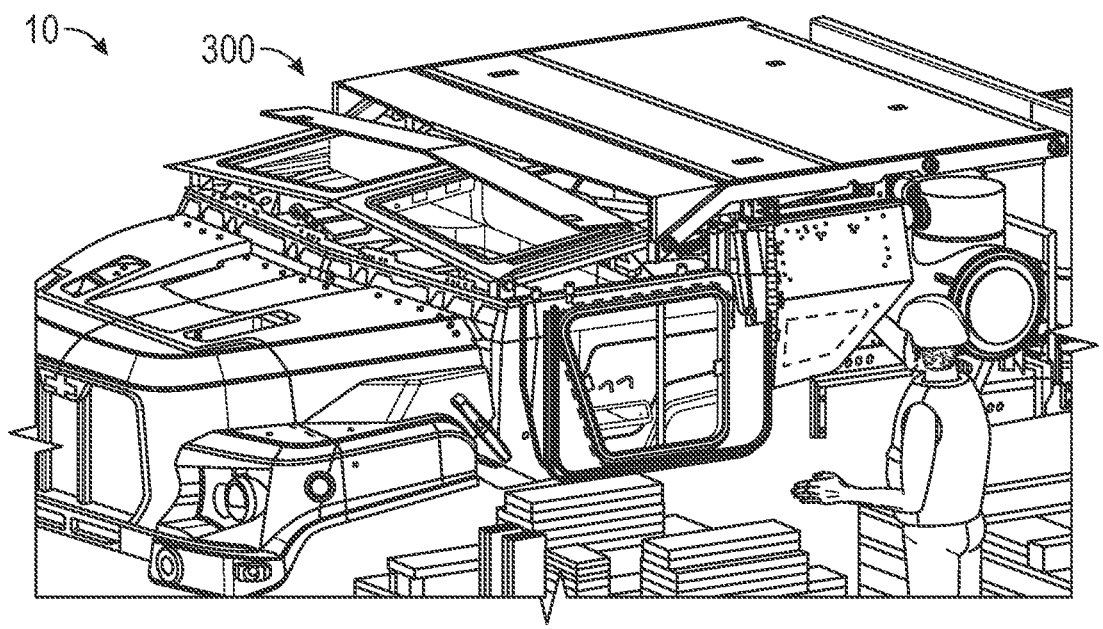
FIG. 10 is a perspective view of the foldable cabin of FIG. 8 on a vehicle in a folded position.
Figure 11:
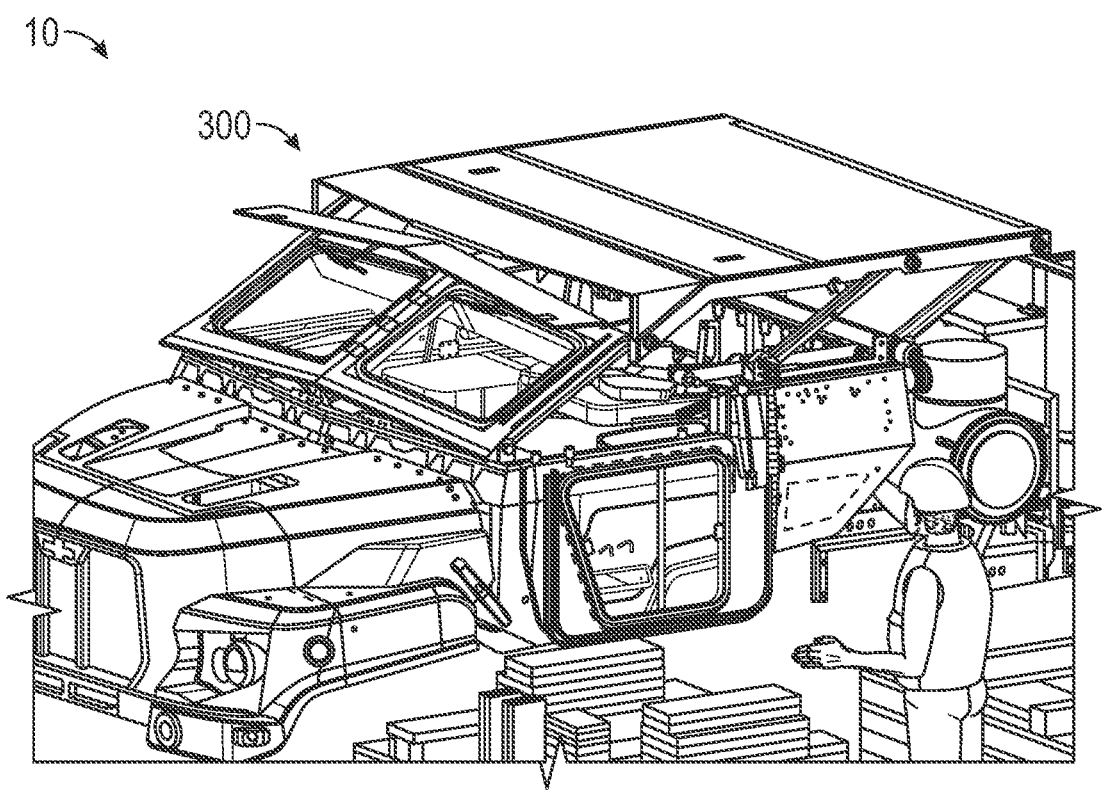
FIG. 11 is a perspective view of the foldable cabin of FIG. 8 on the vehicle in a partially unfolded position.
Figure 12:
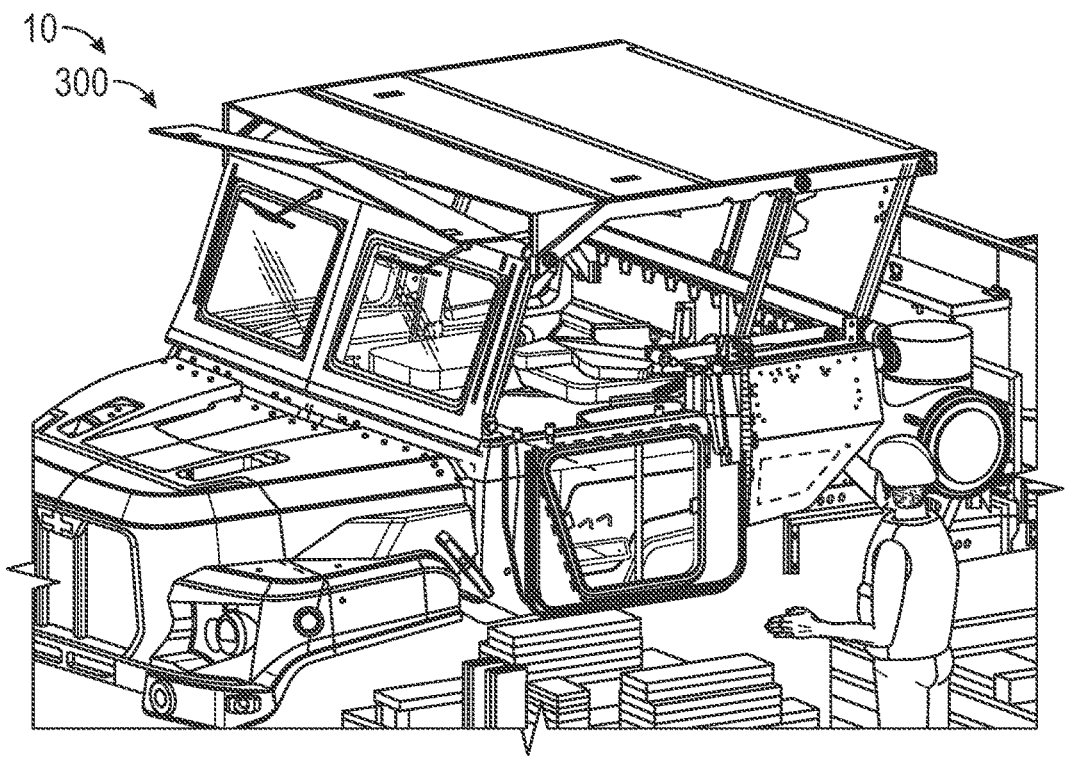
FIG. 12 is a perspective view of the foldable cabin of FIG. 8 on the vehicle in a partially unfolded position.

Referring to FIGS. 8-9, the top assembly 208 can be interchangeable with a foldable top assembly 308, thereby defining a foldable cabin 300. The foldable top assembly 308 can be transitionable between a deployed position, configuration, state, mode, etc., as shown in FIGS. 8 and 9, and a folded, tucked, stowed, low-profile, etc., as shown in FIG. 10. The foldable top assembly 308 includes panels, walls, plates, etc., shown as panels 302a-302f, that define the foldable top assembly 308. In particular, the foldable top assembly 308 is configured to interlock, couple, attach, rest upon, be fastened to, etc., the bottom assembly 210 in the same or similar position as the top assembly 208 as described in greater detail above with reference to FIGS. 5-7.

Figure 15:
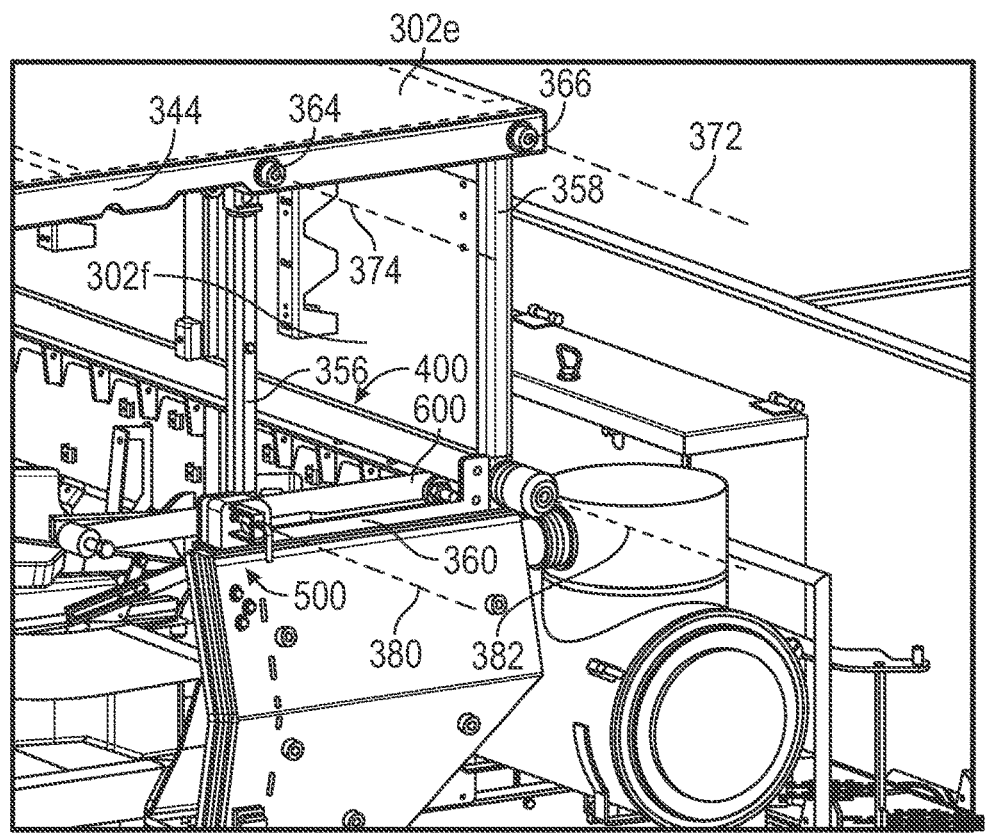
FIG. 15 is a perspective view of a torsion bar assembly of the foldable cabin of FIG. 8.

The foldable top assembly 308 includes front panels 302a and 302b that define apertures 318 for windows 352, a first side wall 302c, a second side wall 302d, a roof 302e, and a rear 302f (see e.g., FIG. 15). The first side wall 302c and the second side wall 302d are configured to receive doors 1100 to limit or allow access to an interior of the foldable cabin 300. The first side wall 302c and the second side wall 302d can cooperatively form an opening, window, aperture, etc., with the bottom assembly 210 for receiving the doors 1100. The foldable top assembly 308 defines a vertical axis 312 that is parallel and/or co-axial with the vertical axis 212 of the bottom assembly 210 when the foldable top assembly 308 is coupled with the bottom assembly 210.

Figure 13:
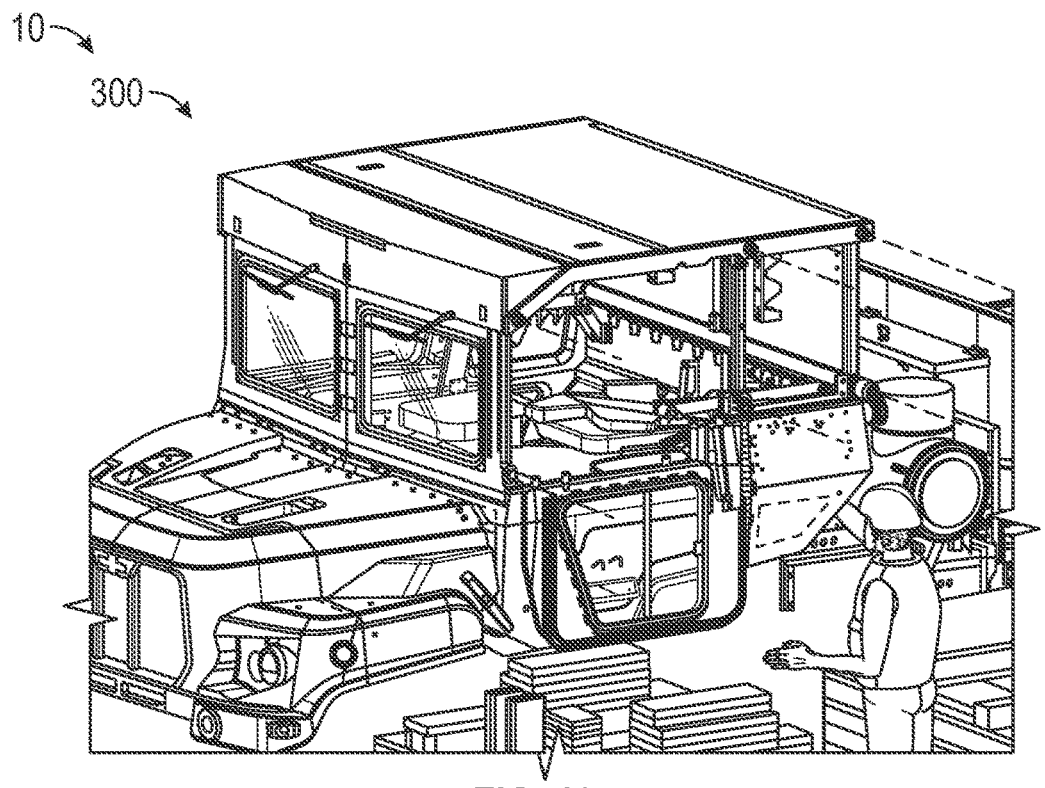
FIG. 13 is a perspective view of the foldable cabin of FIG. 8 on the vehicle in a deployed or unfolded position.

Referring to FIGS. 10-14, the foldable cabin 300 is shown transitioning from the folded or tucked position (in FIG. 10) to the deployed position (in FIG. 13). The foldable cabin 300 can be configured to semi-autonomously transition from the folded position shown in FIG. 10 to the deployed position shown in FIG. 13 and FIG. 14. The process as shown in FIGS. 10-13 can be initiated by an operator or personnel of the vehicle 10. In some embodiments, the foldable cabin 300 is spring-loaded so that the foldable cabin 300 can be raised or folded from the position shown in FIG. 10 to the deployed position shown in FIGS. 13 and 14.

Figure 14:
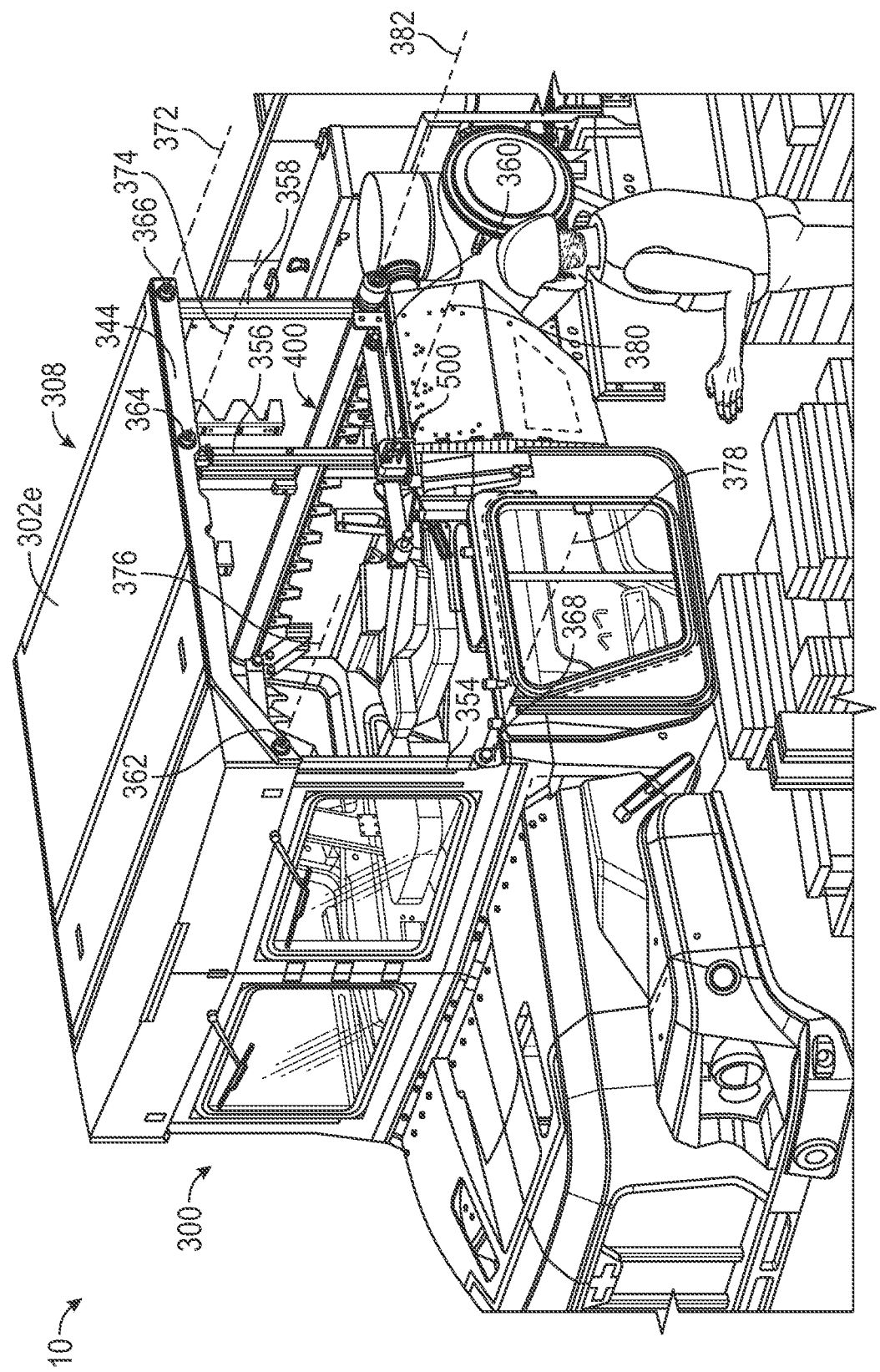
FIG. 14 is a perspective view of the foldable cabin of FIG. 8 on the vehicle in the deployed or unfolded position.

Referring particularly to FIGS. 14-15, the foldable cabin 300 includes a first pair of support members 354 (e.g., a front pair of support members, a second pair of support members 356 (e.g., a medial pair of support members), and a third pair of support members 358 (e.g., a rear pair of support members). The first pair of support members 354, the second pair of support members 356, and the third pair of support members 358 can be configured to form a four-bar linkage or a linkage system that is rotatable between a folded position and a deployed position. The pairs of support members 354, 356, and 358, may each include a pair of rotatable bars, beams, linkages, etc., positioned on either side (e.g., a left and right side) of the foldable cabin 300. The foldable top assembly 308 also includes a top pair of beams, bars, rigid members, etc., shown as linkage 344. The linkage 344 can be fixedly coupled with the roof 302e of the foldable cabin 300. The first pair of support members 354 are pivotally coupled at opposite ends with the bottom assembly 210 and the linkage 344. Specifically, the first pair of support members 354 are rotatably coupled with the linkage 344 at a pivot point 362, and rotatably coupled with the bottom assembly 210 at pivot point 368. Similarly, the second pair of support members 356 are rotatably coupled with the linkage 344 at pivot point 364, and rotatably coupled with the bottom assembly 210 at locking assembly 500. The third pair of support members 358 are rotatably coupled with the linkage 344 at pivot point 366 and a torsion bar assembly 400. The locking assembly 500 and the torsion bar assembly 400 can be coupled with each other through a linkage 360 (e.g., a bottom frame, a rail, a structural component, etc.) that is fixedly coupled with the bottom assembly 210. In some embodiments, the linkage 360 includes openings or interfaces and is configured to fixedly couple with a corresponding portion or surface of the bottom assembly 210. In some embodiments, the foldable top assembly 308 includes multiple linkages 360 that define a lower structural or frame component of the foldable top assembly 308. The multiple linkages 360 can form a footprint or perimeter of the foldable top assembly 308 and can be configured to abut, rest upon, engage, etc., corresponding portions, surfaces, faces, or top edges of the bottom assembly 210. In some embodiments, the linkages 360 include openings, bores, apertures, etc., for fastening or otherwise coupling the foldable top assembly 308 with the bottom assembly 210.

The first pair of support members 354 are positioned at a front of the foldable cabin 300. The third pair of support members 358 are positioned at a back of the foldable cabin 300. The second pair of support members 356 are positioned between the first pair of support members 354 and the third pair of support members 358. The first pair of support members 354 can be positioned at the front of the foldable cabin 300 at a front portion of the door 1100. Similarly, the second pair of support members 356 can be positioned at a rear portion of the door 1100.

The pivot points 368 define an axis 378 about which the first pair of support members 354 rotate relative to the bottom assembly 210. The pivot points 362 define an axis 376 about which the roof 302e and the first pair of support members 354 rotate relative to each other. The locking assembly 500 defines an axis 380 about which the second pair of support members 356 rotate relative to the bottom assembly 210. The pivot points 364 define an axis 374 about which the roof 302e and the second pair of support members 356 rotate relative to each other. The torsion bar assembly 400 defines an axis 382 about which the third pair of support members 358 rotate relative to the bottom assembly 210. The pivot points 366 define an axis 372 about which the third pair of support members 358 and the roof 302e rotate relative to each other.

Figure 17:
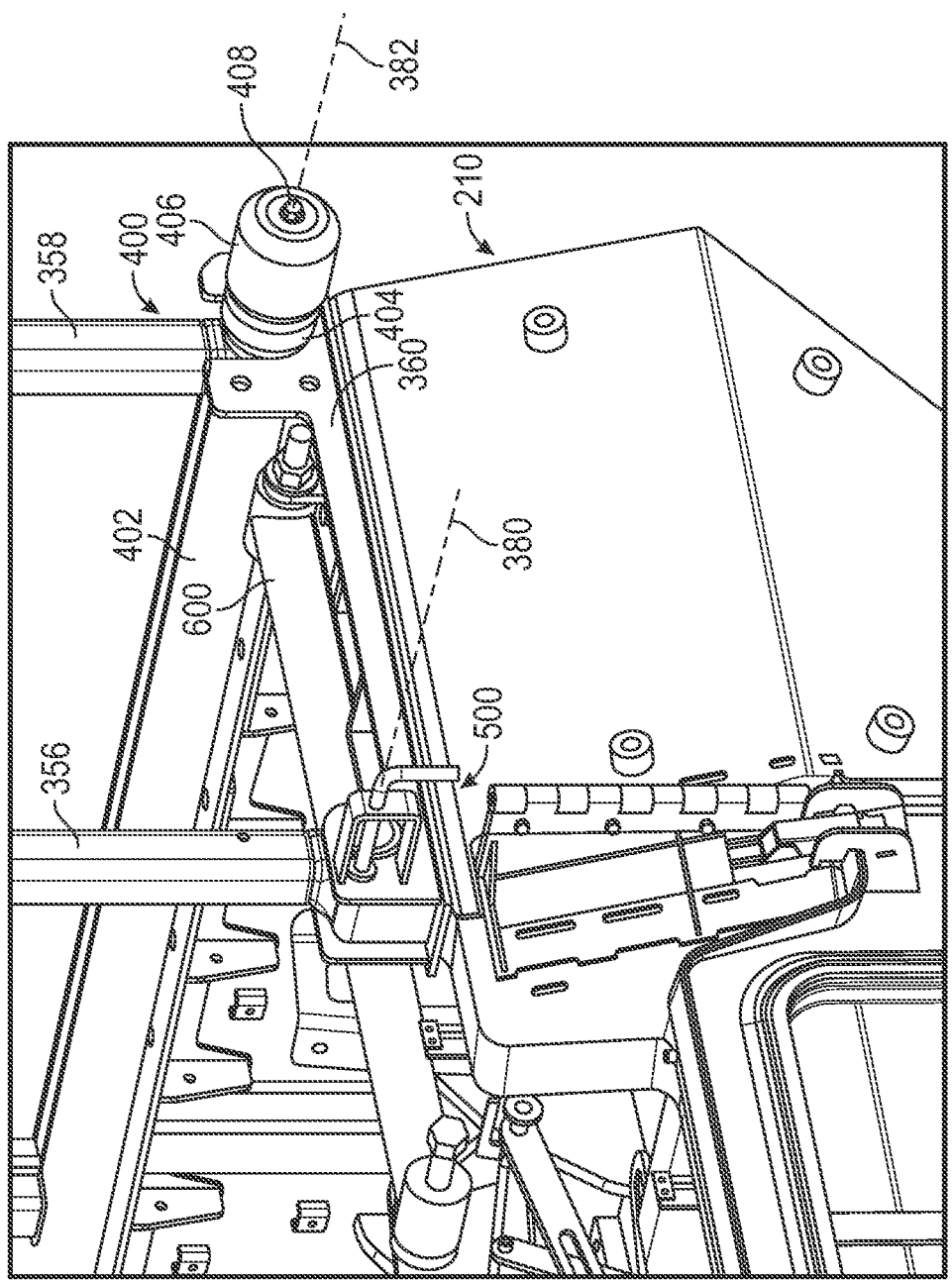
FIG. 17 is a perspective view of the torsion bar assembly of the foldable cabin of FIG. 8.

Referring particularly to FIGS. 15 and 17, the torsion bar assembly 400 is shown in greater detail. The torsion bar assembly 400 includes an inner race 402 (e.g., an inner tube, an inner bar, an inner cylindrical member, etc.) and an outer race 404 that are rotatable relative to each other. The outer race 404 is fixedly coupled with the linkage 360 and/or the bottom assembly 210. The inner race 402 can be fixedly coupled with the third pair of support members 358 so that the inner race 402 drives the third pair of support members 358 to rotate relative to the bottom assembly 210. The torsion bar assembly 400 also includes a torsional spring assembly 406 that is configured to drive the inner race 402 to rotate relative to the outer race 404. In some embodiments, one of the inner race 402 and the outer race 404 is fixedly coupled with the bottom assembly 210 (e.g., the linkage 360 of the bottom assembly 210), and the other of the inner race 402 and the outer race 404 is fixedly coupled with the rear 302f. In some embodiments, the foldable top assembly 308 is maintained in the tucked or folded position by one or more straps that, when cut, allow the torsion bar assembly 400 to exert torque to at least partially transition the foldable top assembly 308 into the deployed position. As shown in FIG. 17, the torsion bar assembly 400 also includes a tool interface 408 (e.g., a hex nut, a depression, a fitting, etc.) that is configured to receive a tool. After the torsion bar assembly 400 has exerted torque and partially deployed the foldable top assembly 308, the operator may couple the tool with the tool interface 408 and manually exert a torque to fully deploy the foldable top assembly 308.

Figure 16:
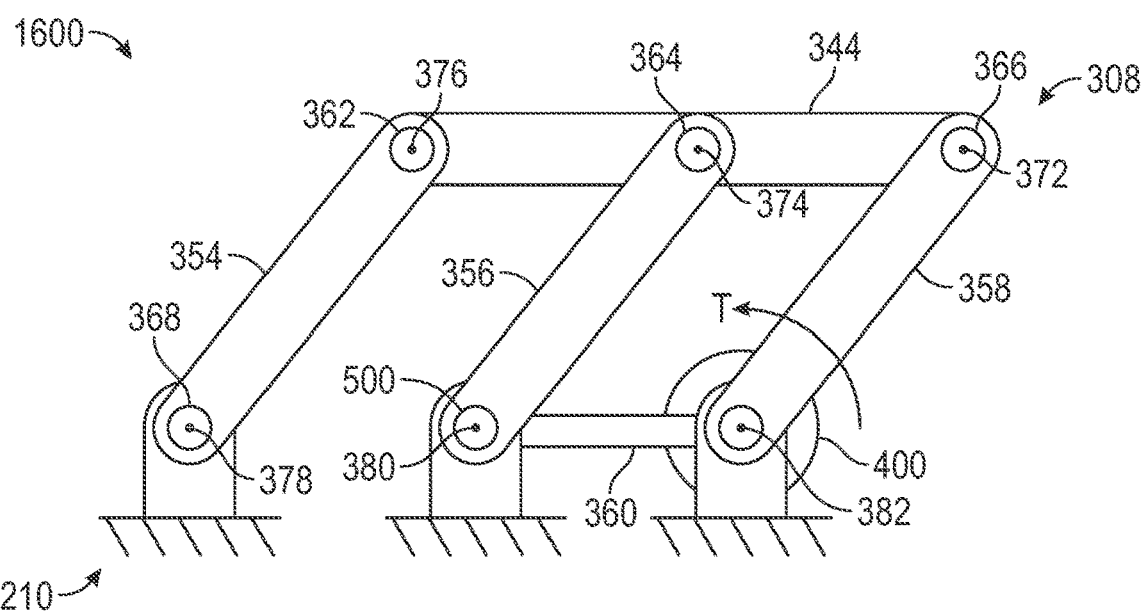
FIG. 16 is a diagram of the foldable top assembly of the foldable cabin of FIG. 8 as a linkage system.

Referring to FIG. 16, a diagram 1600 of the support members as a linkage mechanism is shown. The diagram 1600 illustrates the first pair of support members 354, the second pair of support members 356, and the third pair of support members 358. The first pair of support members 354, the second pair of support members 356, and the third pairs of support members 358 are each pivotally or rotatably coupled with the linkage 344 at pivot points 362, pivot points 364, and pivot points 366 such that the linkage 344 rotates relative to the first pair of support members 354, the second pair of support members 356, and the 3 third pair of support members 358 about the axis 376, the axis 374, and the axis 372. The torsion bar assembly 400 is configured to exert a torque T to the support members 358 to rotate the support members 358 about the axis 382 and to thereby drive the foldable top assembly 308 to transition from the folded or tucked position into the deployed position. Driving the support members 358 (e.g., in a counter-clockwise direction to deploy the foldable top assembly 308) causes the support members 356 and the support members 354 to rotate about axis 380 and axis 378, respectively, in a counter-clockwise direction.

Figure 18:
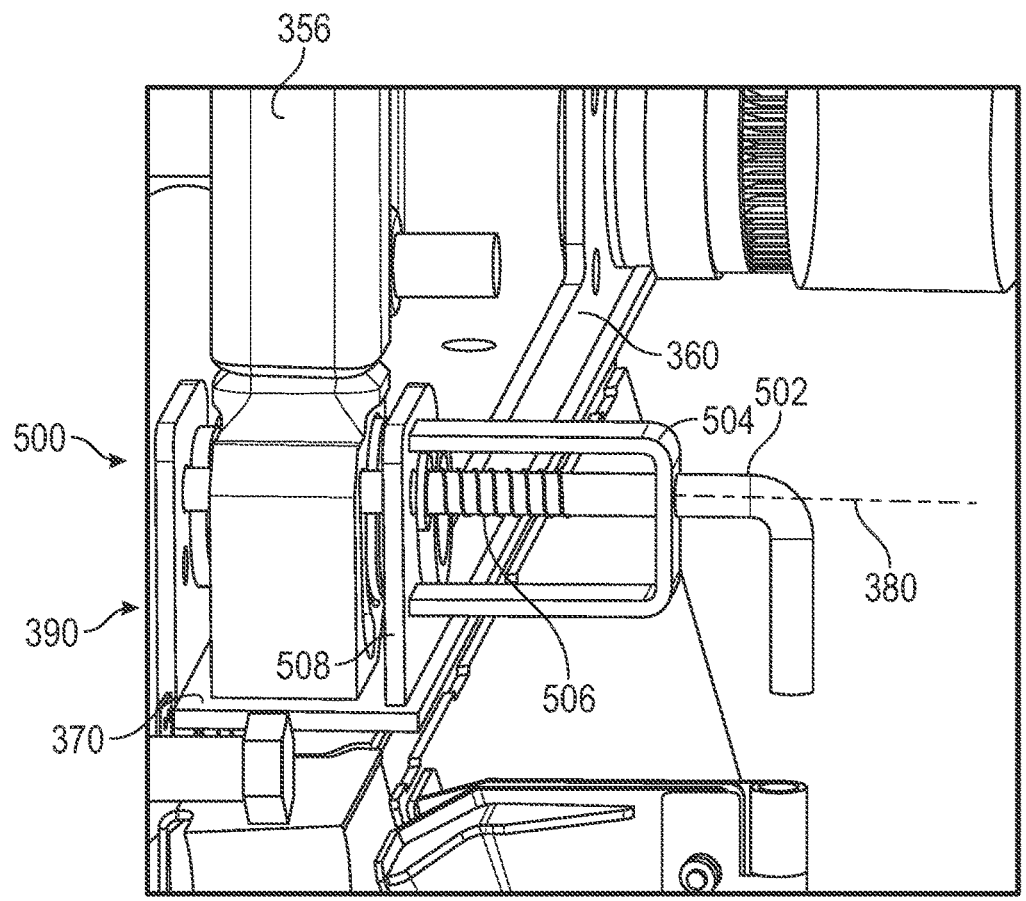
FIG. 18 is a perspective view of a locking assembly of the foldable cabin of FIG. 8.
Figure 19:
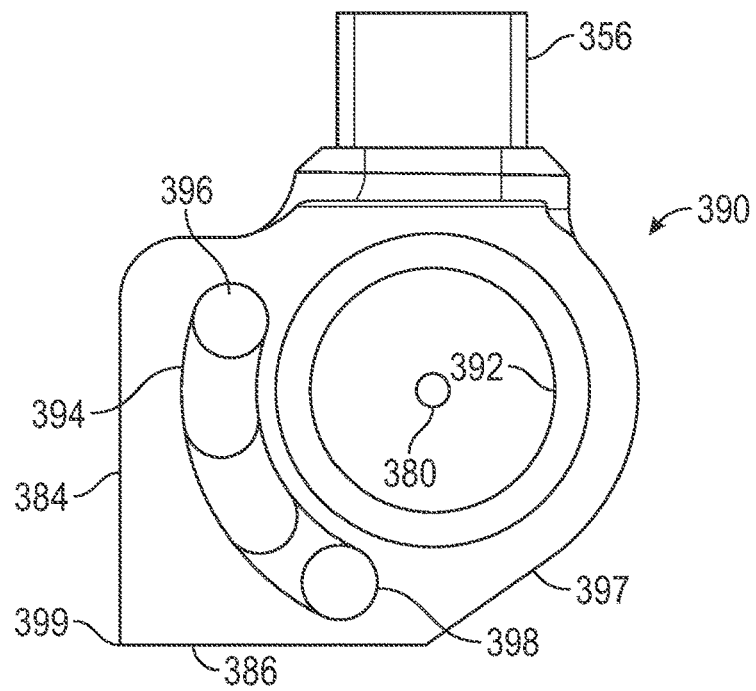
FIG. 19 is a side view of a bottom of a linkage of the foldable cabin of FIG. 8 that interacts with the locking assembly of FIG. 18.
Figure 20:
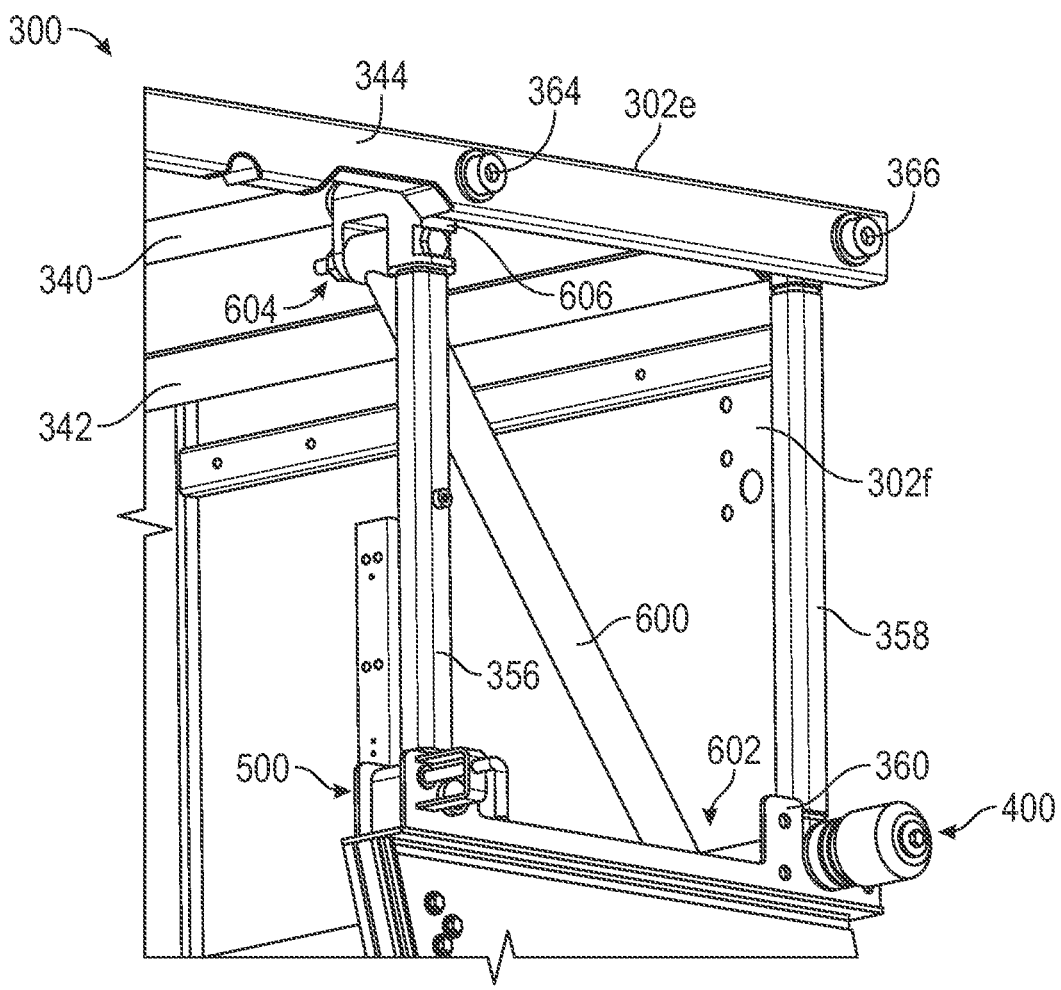
FIG. 20 is a perspective view of a portion of the foldable cabin of FIG. 8 showing one or more support members.

Referring to FIGS. 18 and 19, the locking assembly 500 is shown in greater detail, according to an exemplary embodiment. The locking assembly 500 includes a pin 502 that can be actuated along an axis 380, and a bracket 504. The pin 502 can be pulled in a direction that is substantially parallel with the axis 380 to release the foldable top assembly 308 so that torque exerted by the torsional spring assembly 406 drives the support members 358 to rotate about the axis 380 in a counter-clockwise direction (e.g., to deploy the foldable top assembly 308 out of the tucked or stowed position).

The pin 502 is configured to be received within an opening (e.g., an aperture, a hole, a bore, a window, etc.) of the bracket 504 so that the pin 502 is translationally fixed relative to the bracket 504 except in the direction that is substantially parallel with the axis 380. The locking assembly 500 also includes a spring 506 (e.g., a resilient member, a compression spring, etc.) that is configured to bias the pin 502 to translate in a direction towards the second pair of support members 356. Accordingly, when the pin 502 is translated to release the foldable top assembly 308 to deploy, the pin 502 is translated into a direction opposite the direction that the spring 506 biases the pin 502.

As shown in FIG. 18, the locking assembly 500 includes a clevis 508 about which the second pair of support members 356 are configured to rotate. The clevis 508 is fixedly coupled or integrally formed with the bracket 504 and is also fixedly coupled or integrally formed with the linkage 360. The locking assembly 500 may also include a pin that is rotatably coupled with at least one of the clevis 508 or an end 390 of the second pair of support members 356 to facilitate rotation of the second pair of support members 356 relative to the clevis 508 (e.g., about the axis 380).

As shown in FIG. 19, the end 390 of the second pair of support members 356 that are received within the clevis 508 include an opening 392 (e.g., an aperture, a bore, etc.), a corner 399 defined by a first flat surface 384 and a second flat surface 386. The end 390 also includes a slot, a channel, a groove, etc., shown as annular groove 394 that extends along a portion of the opening 392. The annular groove 394 is provided as a depression within a surface or face of the end 390 that faces the pin 502. The end 390 also includes a first aperture 396 at a first end of the annular groove 394 and a second aperture 398 at a second end of the annular groove 394. The first aperture 396 and the second aperture 398 can extend through an entire thickness of the end 390 of the second pair of support members 356. The first aperture 396 and the second aperture 398 are configured to receive the pin 502 therethrough when the foldable top assembly 308 is in the tucked or folded position, and in the deployed or unfolded position.

The end 390 of the second pair of support members 356 also includes a third flat surface 397 that is angled or slanted relative to the second flat surface 386. The second flat surface 386 and the third flat surface 397 are angled or oriented relative to each other at an angle that is greater than ninety degrees.

When the foldable top assembly 308 is in the tucked, stowed, folded, etc., position or configuration, the pin 502 is received through the second aperture 398, and the third flat surface 397 abuts, contacts, engages, is substantially parallel with, etc., a top surface 370 of the linkage 360. When the pin 502 is pulled out of the second aperture 398, the second support members 356 are driven to rotate (e.g., through the third support members 358 and the linkage 344 due to the torque exerted by the torsion bar assembly 400) about the axis 380 in the counter-clockwise direction (e.g., to or toward the deployed, unfolded, etc., position or configuration as shown in FIG. 13 for example). As the second support members 356 are driven to rotate about the axis 380 in the counter-clockwise direction due to the torque exerted by the torsional spring assembly 406, an end of the pin 502 may be driven into engagement with the surface of the annular groove 394 due to the force exerted by the spring 506, and may follow along the surface of the annular groove 394 as the second support members 356 rotate relative to the clevis 508 and therefore rotate relative to the pin 502. When the foldable top assembly 308 is transitioned into the deployed or unfolded position, the second support members 356 may be substantially upright, with the second flat surface 386 abutting, contacting, engaging, being substantially parallel with, etc., the top surface 370 of the linkage 360. When the foldable top assembly 308 is transitioned into the deployed or unfolded position, the pin 502 may align with the first aperture 396 so that the pin 502 is driven to pass through the first aperture 396 to lock the foldable top assembly 308 in the deployed or unfolded position.

Referring to FIGS. 15, 17, and 20-23, the foldable top assembly 308 of the foldable cabin 300 includes one or more support members 600 that are configured to be selectably coupled to provide additional support for the foldable top assembly 308 when the foldable top assembly 308 is transitioned into the deployed or unfolded position. As shown in FIGS. 20-23, each of the support members 600 include a first end 602 and a second end 604. The first end 602 and the second end 604 of the support members 600 are coupled with mounts 606 that are fixedly coupled with different portions of the folding top assembly 308. The first end 602 of the support members 600 are hingedly or rotatably coupled with a first mount 606a (e.g., a clevis, a bracket, etc.) that is fixedly coupled with the linkage 360 proximate a rearward, back, bottom corner of the foldable top assembly 308 (e.g., proximate the torsion bar assembly 400. The second end 604 of the support members 600 are coupled with a second mount 606b (e.g., a clevis, a bracket, etc.) that is coupled with a top end of the second support members 356 or coupled with a bar 340 that extends between the second support members 356 proximate the roof 302*e*.

The support members 600 may be hingedly coupled with the first mount 606*a* and removably coupled with the second mount 606*b*. When the foldable top assembly 308 is in the folded or tucked position, the support members 600 are de-coupled from the second mount 606*b* but may be coupled with the first mount 606*a*. After the foldable top assembly 308 has been deployed (e.g., by pulling the pin 502 to allow the torque exerted by the torsional spring assembly 406 to transition the foldable top assembly 308 into the deployed or unfolded position), the support members 600 can be installed (e.g., pinned at the first ends 602 with the first mounts 606*a* and pinned at the second ends 604 with the second mounts 606*b*) to provide additional reinforcement or structural support for the foldable top assembly 308.

Figure 22:
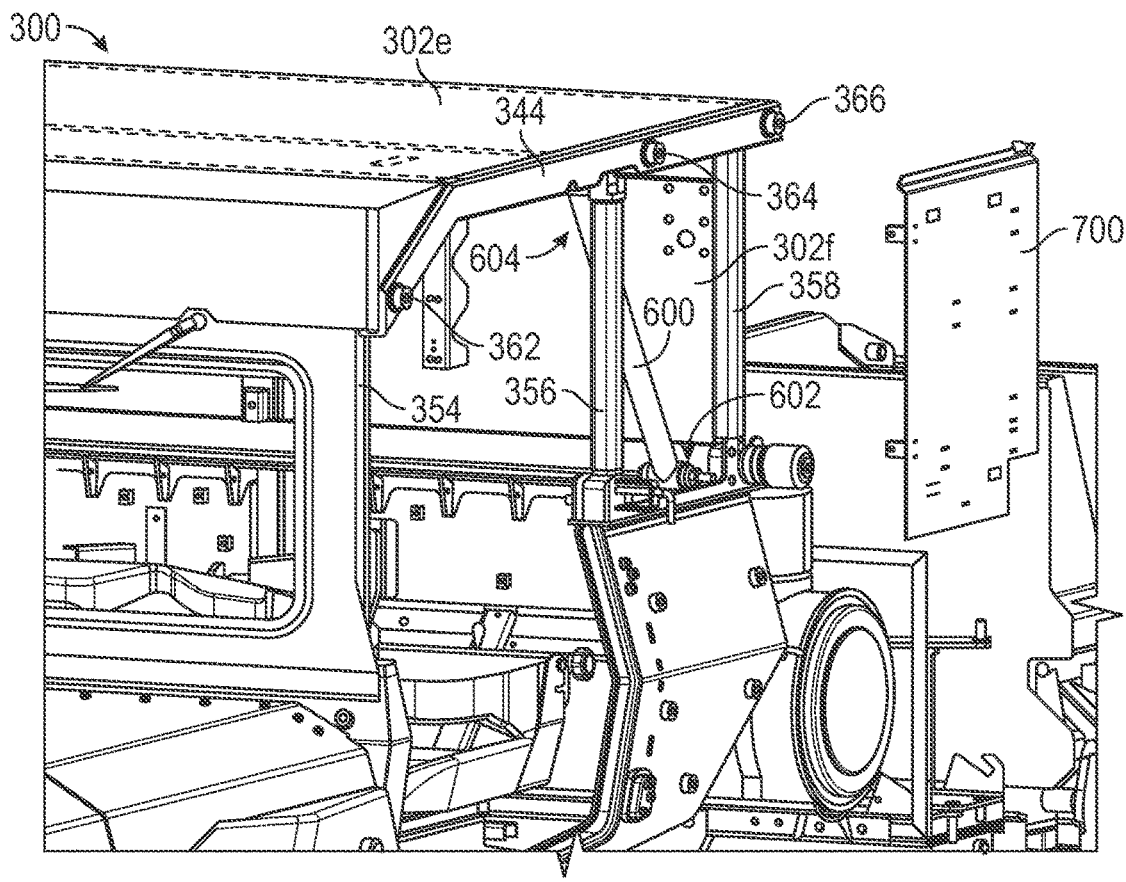
FIG. 22 is a perspective view of a portion of the foldable cabin of FIG. 8 showing the installation of rear side panels.
Figure 23:
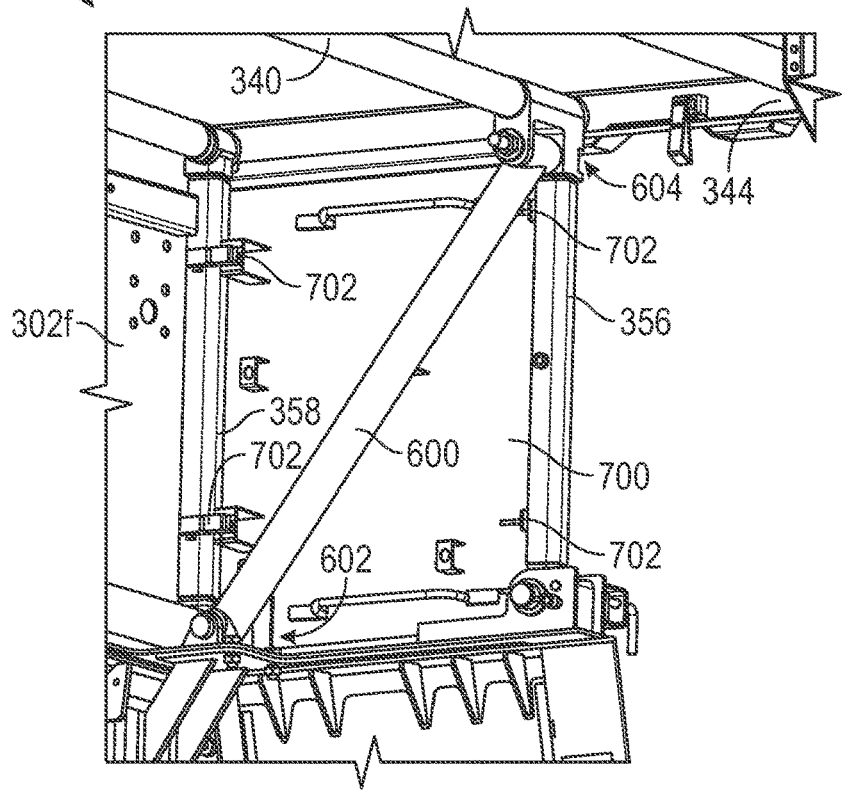
FIG. 23 is a perspective view of a portion of the foldable cabin of FIG. 8 showing the installation of the rear side panels.

As shown in FIGS. 22-23, one or more panels 700 (e.g., rear side panels) can be installed on sides the foldable top assembly 308 (e.g., after the foldable top assembly 308 is deployed and the support members 600 are installed). The one or more panels 700 are provided as a pair of side panels that are mounted, coupled, installed, etc., on either side of the foldable top assembly 308. In some embodiments, the panels 700 are removably coupled with the third pair of support members 358, the second pair of support members 356, the linkage 344, and the linkage 360 on either side (e.g., a left side and a right side, a driver side and a passenger side, etc.) of the foldable top assembly 308. As shown in FIG. 23, each of the panels 700 include brackets 702 that are configured to interlock, couple with, etc., corresponding interlocking members 704 of the foldable top assembly 308 (e.g., along the third pair of support members 358 and the second pair of support members 356).

Figure 24:
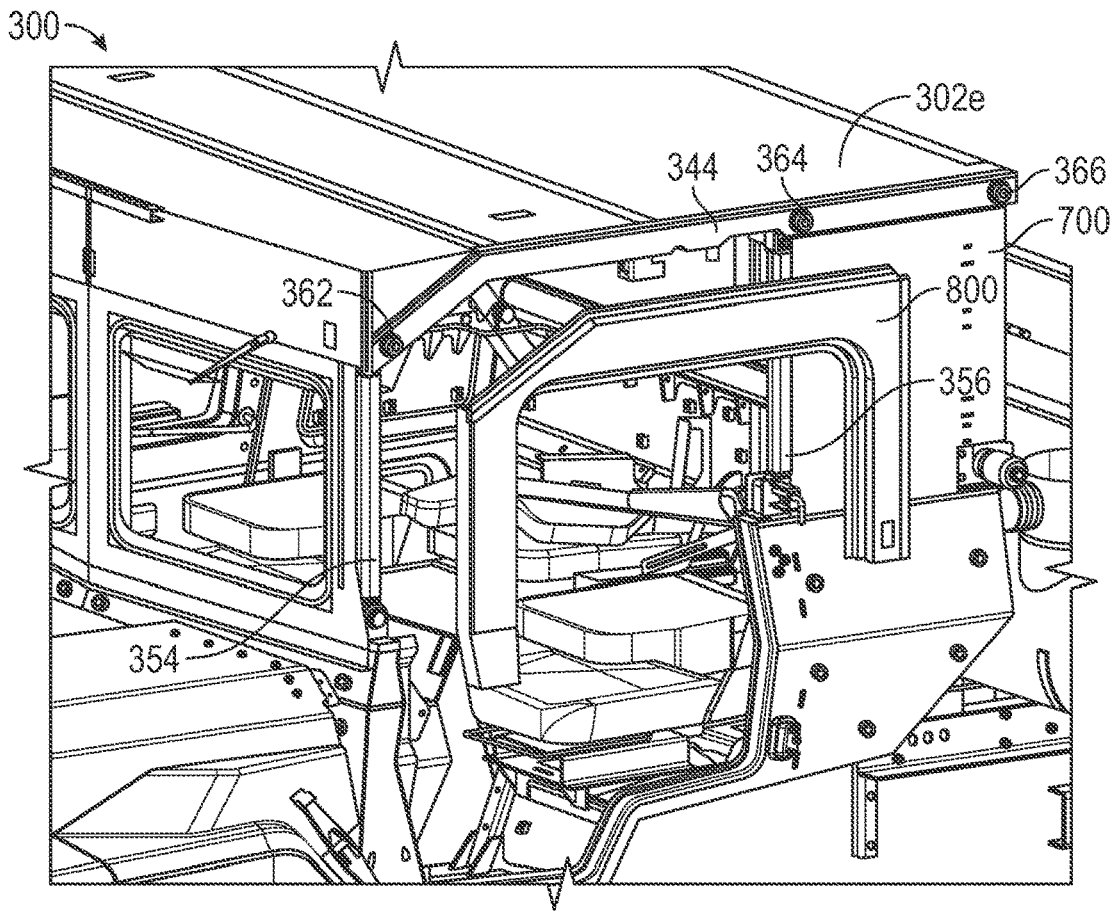
FIG. 24 is a perspective view of a portion of the foldable cabin of FIG. 8 showing the installation of front side panels.
Figure 25:
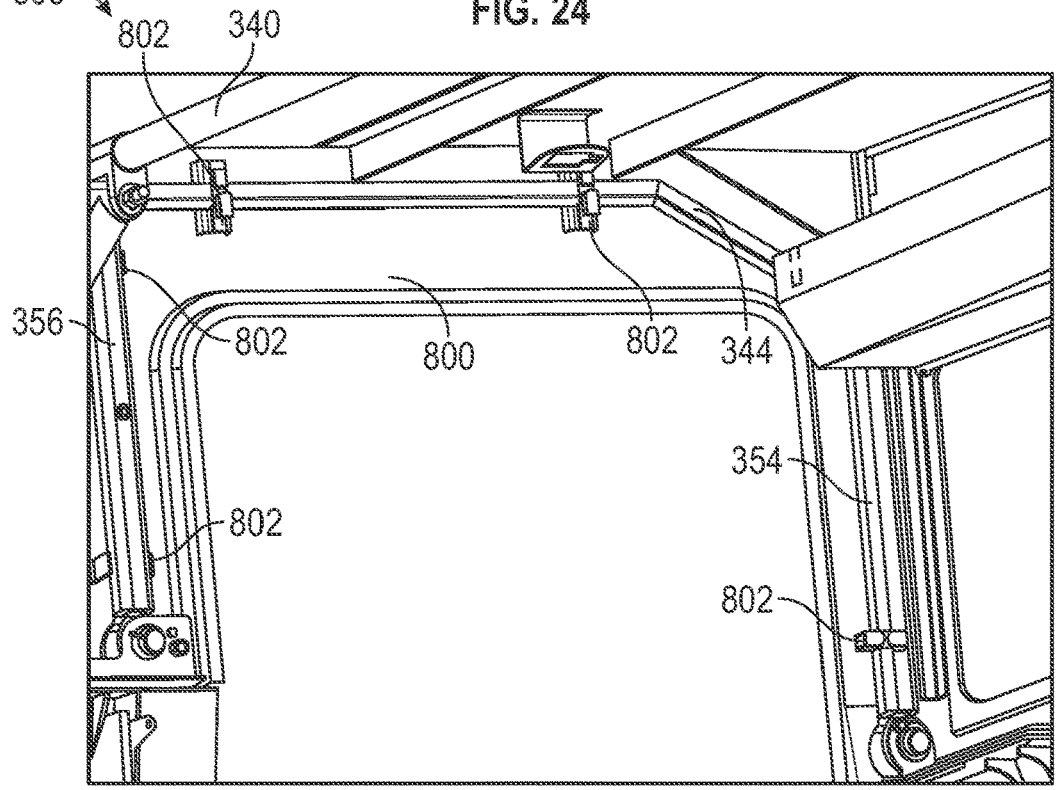
FIG. 25 is a perspective view of a portion of the foldable cabin of FIG. 8 showing the installation of the front side panels.

As shown in FIGS. 24-25, the foldable top assembly 308 is configured to receive one or more front side panels 800 that are contoured to an opening for the door 1100. The front side panels 800 can be similar to the panels 700 but are configured for coupling to sides of the foldable top assembly 308 between the first support member 354, the second support members 356, and the linkage 344 (e.g., in front of the panels 700). Referring particularly to FIG. 25, the front side panels 800 can be coupled with the first support members 354, the second support members 356, and the linkage 344 through brackets 804 and interlocking members 802. The panels 700 and the front side panels 800 can be installed onto the sides of the foldable top assembly 308 as shown after the foldable top assembly 308 is deployed or unfolded. In some embodiments, the panels 700 and the front side panels 800 are installed onto the sides of the foldable top assembly 308 after the support members 600 are installed.

Figure 26:
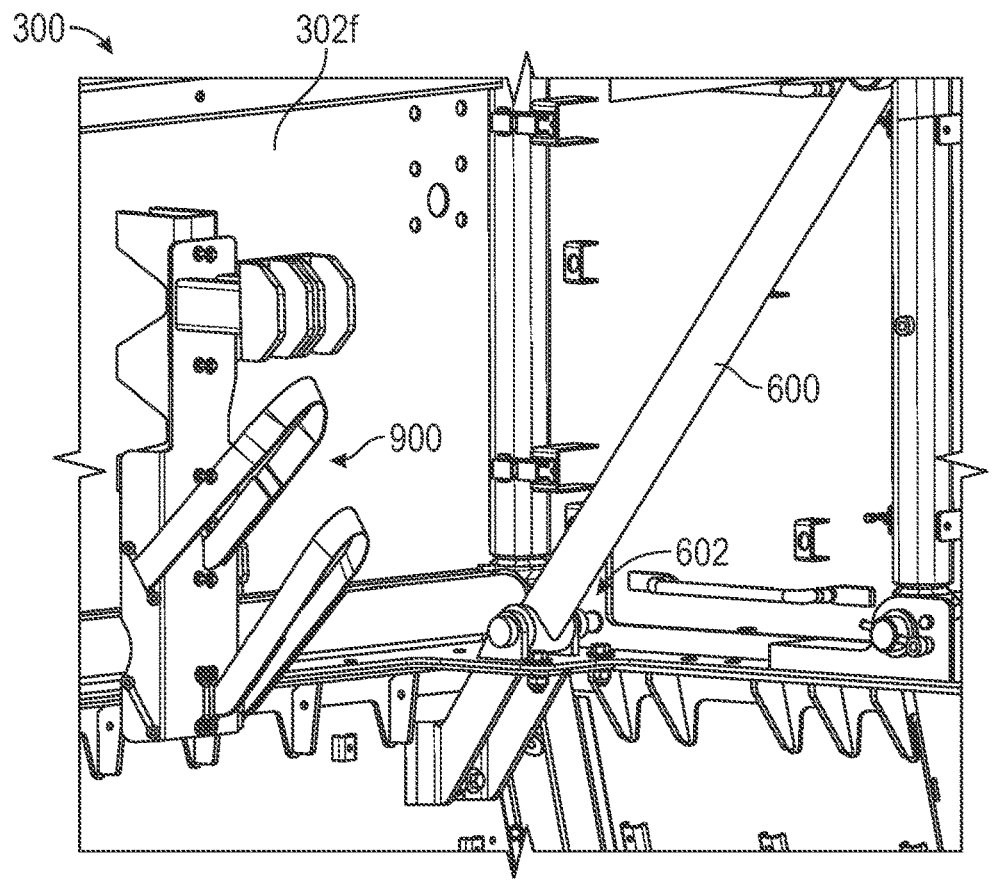
FIG. 26 is a perspective view of a portion of the foldable cabin of FIG. 8 showing the installation of weapons mounts.
Figure 27:
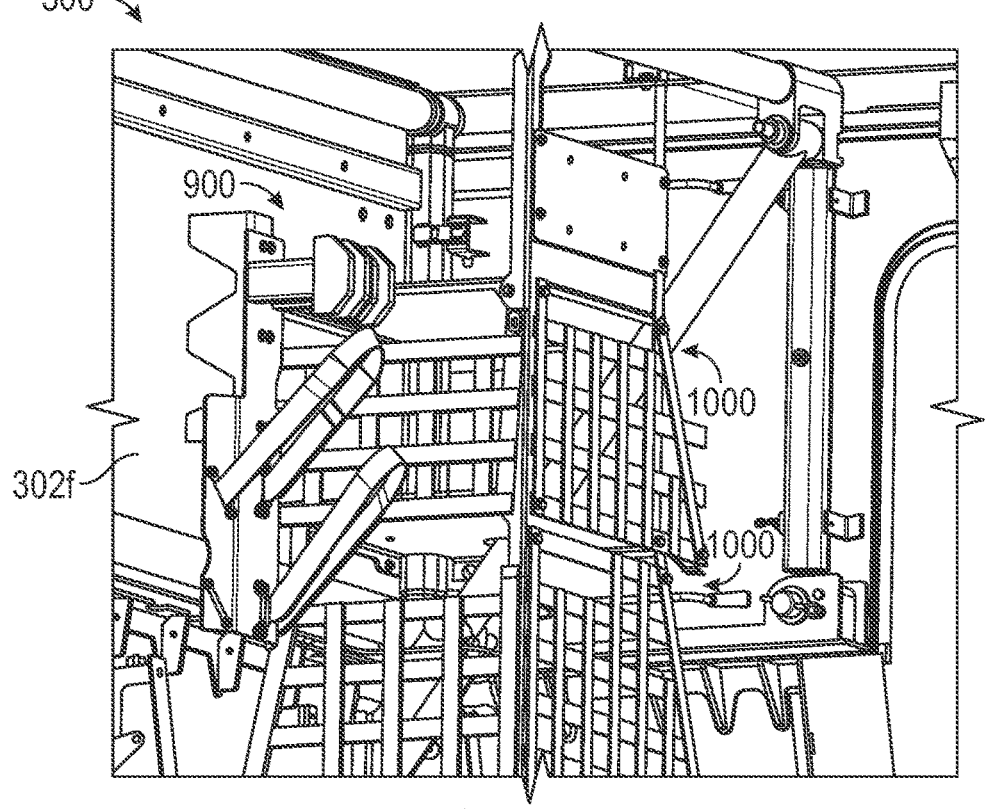
FIG. 27 is a perspective view of a portion of the foldable cabin of FIG. 8 showing the installation of storage units.

Referring to FIGS. 26 and 27, one or more weapons mounts 900 and shelving units 1000 (e.g., storage bins, canisters, nets, meshes, etc.) can be installed within the foldable cabin 300. The weapons mounts 900 and the shelving units 1000 can be installed (e.g., coupled, mounted, attached, secured, etc.) on the rear 302*f*, a floor of the foldable cabin 300, and/or the roof 302*e* of the foldable cabin 300. In some embodiments, the weapons mounts 900 and/or the shelving units 1000 are installed after the panels 700 and the front side panels 800 are coupled on either side of the foldable cabin 300. In some embodiments, the weapons mounts 900 and/or the shelving units 1000 are installed after the support members 600 are installed.

Figure 28:
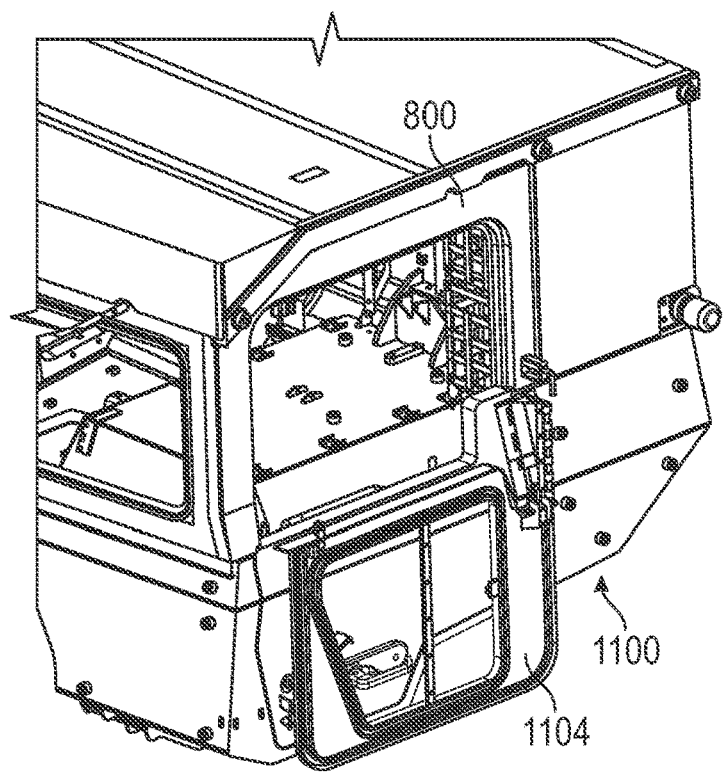
FIG. 28 is a perspective view of a portion of the foldable cabin assembly of FIG. 8 showing a door installed on the foldable cabin with a hinged upper portion in a folded position.
Figure 29:
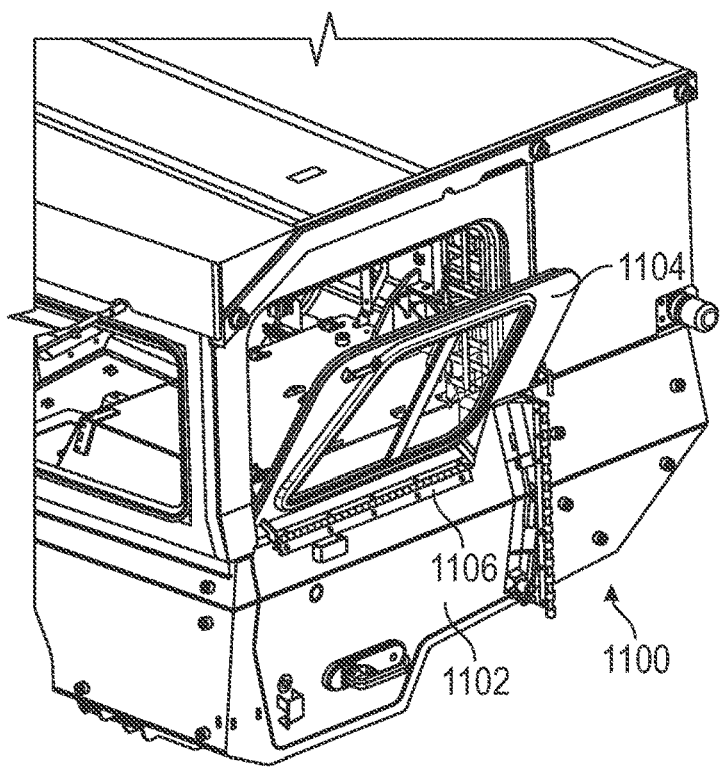
FIG. 29 is a perspective view of a portion of the foldable cabin assembly of FIG. 8 showing the door installed on the foldable cabin with the hinged upper portion in a partially unfolded position.
Figure 30:
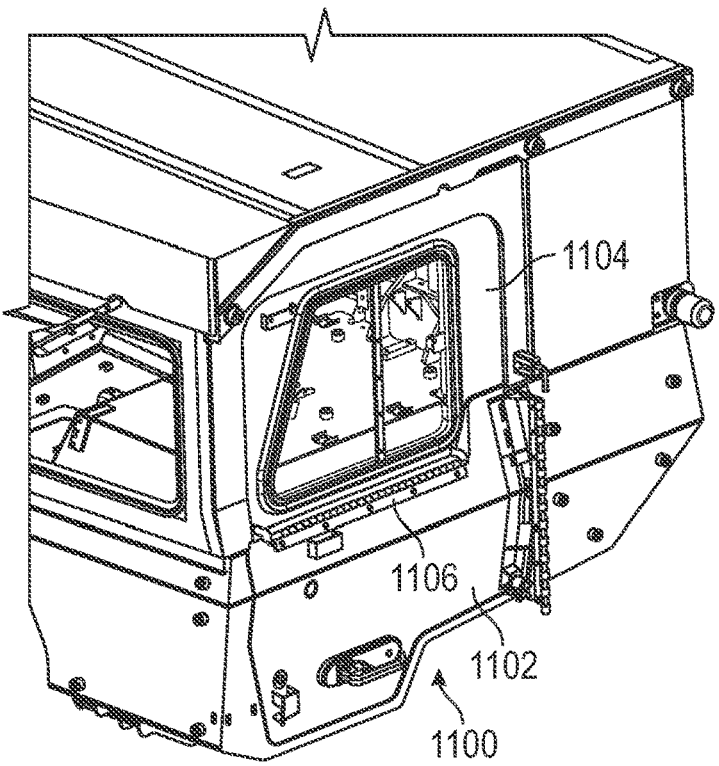
FIG. 30 is a perspective view of a portion of the foldable cabin assembly of FIG. 8 showing the door installed on the foldable cabin with the hinged upper portion in a completely unfolded position.
Figure 31:
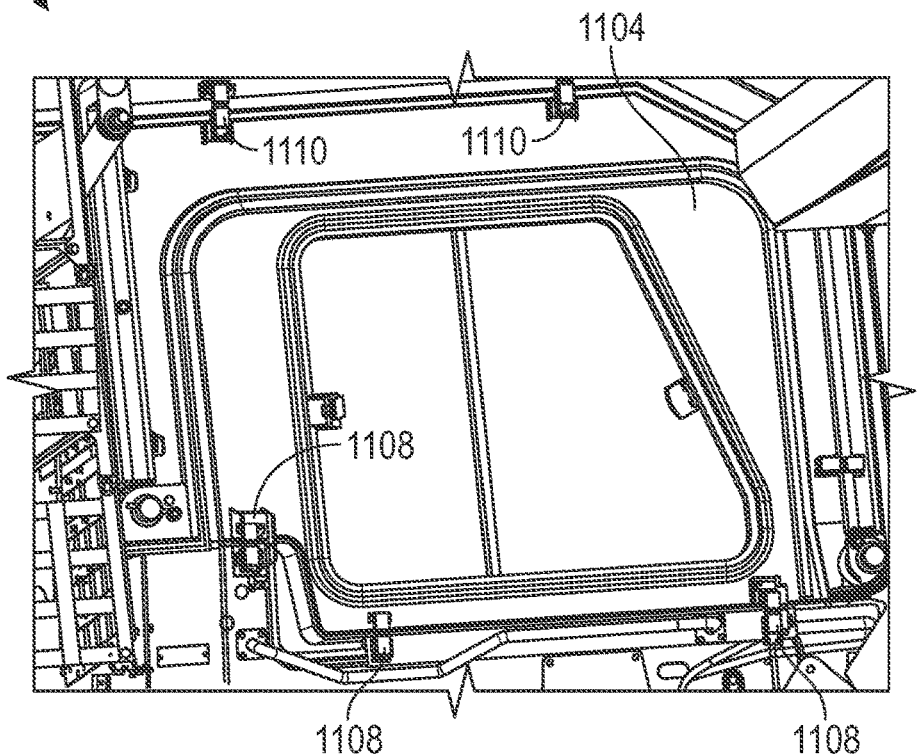
FIG. 31 is an interior view of the door of FIGS. 28-30 in the completely unfolded position of FIG. 30.

Referring to FIGS. 28-31, the door 1100 may be installed onto the sides of the foldable cabin 300. The doors 1100 can be installed onto the bottom assembly 210 in a folded position as shown in at least FIG. 26. In some embodiments, the doors 1100 are pre-installed (e.g., hingedly coupled through hinges 1106) with the bottom assembly 210. The doors 1110 can include a bottom portion 1102 and an upper portion 1104 that is hingedly coupled with the bottom portion 1102. The upper portion 1104 can include windows (e.g., bullet-proof or explosive-proof glass) that facilitates viewing an exterior of the foldable cabin 300 from an interior of the foldable cabin 300. In some embodiments, the front side panels 800 defines an opening for the upper portion 1104 of the doors 1100 having a shape or periphery that matches a shape or periphery or outer edge of the upper portion 1104 of the doors 1100. The upper portion 1104 can be folded upwards (as shown in FIGS. 28-30) until the upper portion 1104 of the doors 1100 is received within the opening defined by the front side panels 800. As shown in FIG. 31, the upper portion 1104 can be fixedly coupled or secured with the bottom portion 1102 through mounts 1108 that provide a rigid coupling between the upper portion 1104 and the bottom portion 1102. In some embodiments, the front side panels 800 and the side panels 700 include seals along a periphery so that, when installed on the foldable top assembly 308, the front side panels 800 and the side panels 700 facilitate sealing and limit moisture or water transferring to an interior of the foldable cabin 300.

Figure 32:
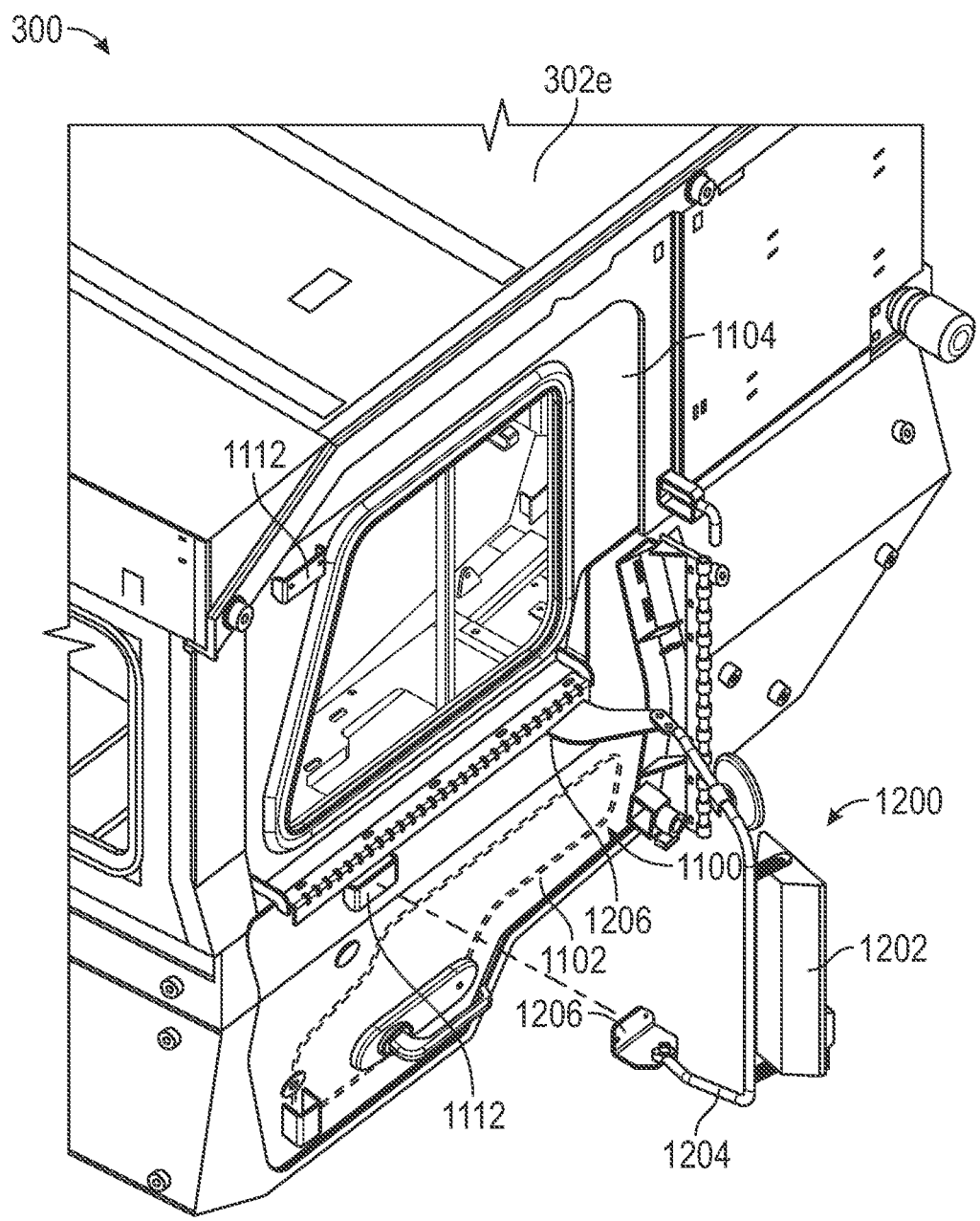
FIG. 32 is a perspective view of a portion of the foldable cabin of FIG. 8 showing the installation of a mirror.

Referring to FIG. 32, the doors 1100 can be configured to receive a mirror assembly 1200. The mirror assembly 1200 includes a mirror component 1202, a bar 1204 (e.g., a beam, an elongated member, a pipe, a conduit, etc.), and brackets 1206 disposed at opposite ends of the bar 1204. The door 1100 includes a pair of mounts 1112 positioned on the upper portion 1104 and the bottom portion 1102, respectively. The mounts 1112 are configured to receive and couple with the brackets 1206 to fixedly couple the mirror assembly 1200 with the door 1100.

Figure 33:
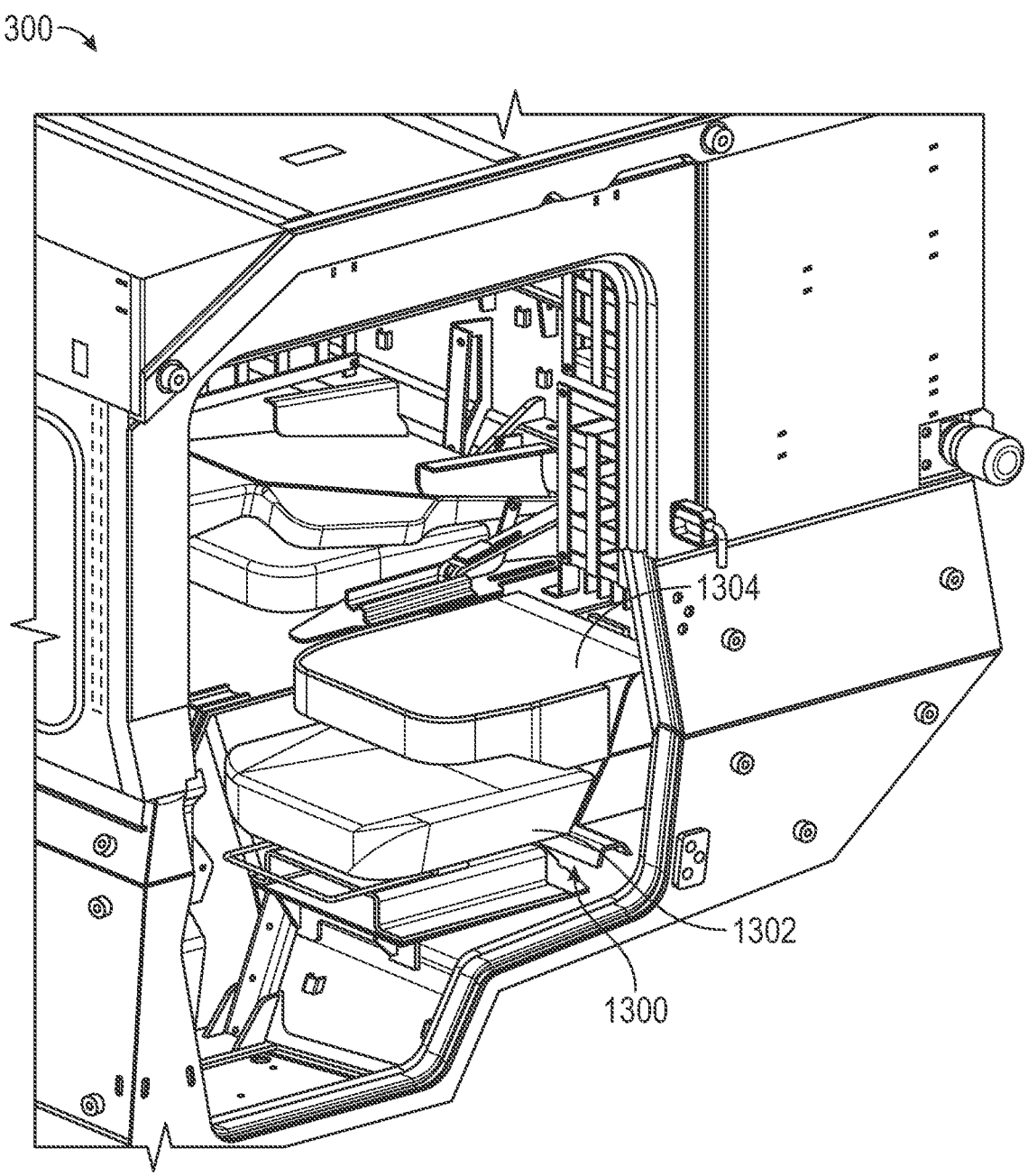
FIG. 33 is a perspective view of a portion of the foldable cabin of FIG. 8 showing seats of the foldable cabin in a folded position.
Figure 34:
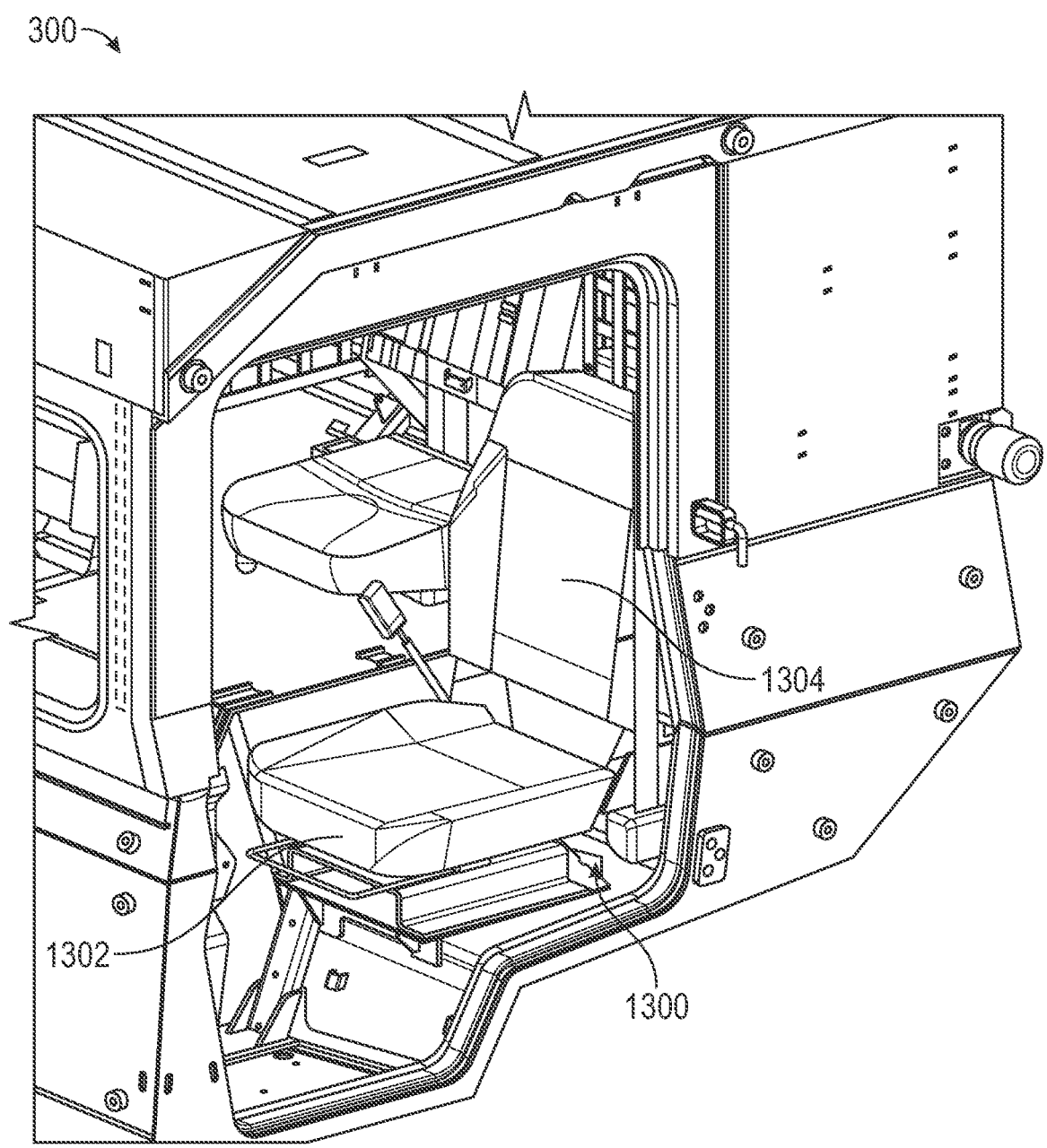
FIG. 34 is a perspective view of a portion of the foldable cabin of FIG. 8 showing the seats of FIG. 33 in an unfolded position.

Referring to FIGS. 33-34, one or more seats 1300 can be installed inside the foldable cabin 300 after the foldable top assembly 308 is deployed, or may be pre-installed inside the foldable cabin 300. The seats 1300 can be positioned within the foldable cabin 300 in a folded position as shown in FIG. 33. Particularly, the seats 1300 include a bottom portion 1302 (e.g., a seat pan, a seat portion) and a back portion 1304 (e.g., a seat back) that is configured to rotate relative to the bottom portion 1302. In this way, the seats 1300 are each transitionable between a tucked, stowed, or folded position as shown in FIG. 33, and a deployed, upright, or unfolded position as shown in FIG. 34. If the seats 1300 are preinstalled inside the foldable cabin 300 (e.g., prior to deployment of the foldable top assembly 308, or during an air drop of the vehicle 10), the back portion 1304 may be folded down (e.g., in the position as shown in FIG. 33) to accommodate the tucked or stowed position of the foldable top assembly 308.

Figure 35:
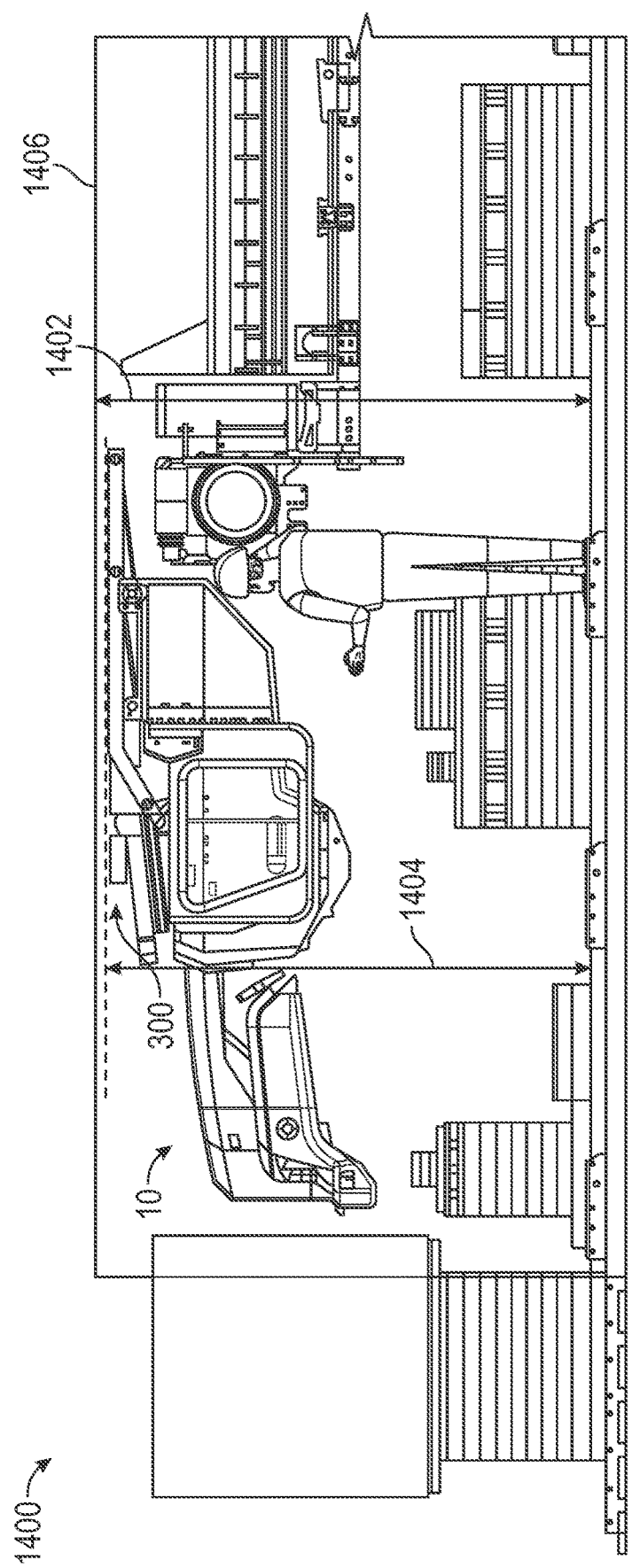
FIG. 35 is a side view of the foldable cabin of FIG. 8 in an aircraft cargo bay for performing an aerial drop.

Referring to FIG. 35, the vehicle 10 may be positioned within a cargo hangar 1406 of an aircraft 1400. When the vehicle 10 is within the cargo hangar 1406 of the aircraft 1400, the foldable cabin 300 can be in the tucked or stowed position as shown to reduce an overall height of the vehicle 10 so that the vehicle 10 can be positioned within the cargo hangar 1406. When the foldable cabin 300 is in the tucked or stowed position, the vehicle 10 can have a height 1404 that is less than a height 1402 of the cargo hangar 1406. For example, the height 1402 of the cargo hangar 1406 may be 100 inches, and the height 1404 of the vehicle 10 may be 98 inches.

Figure 36:
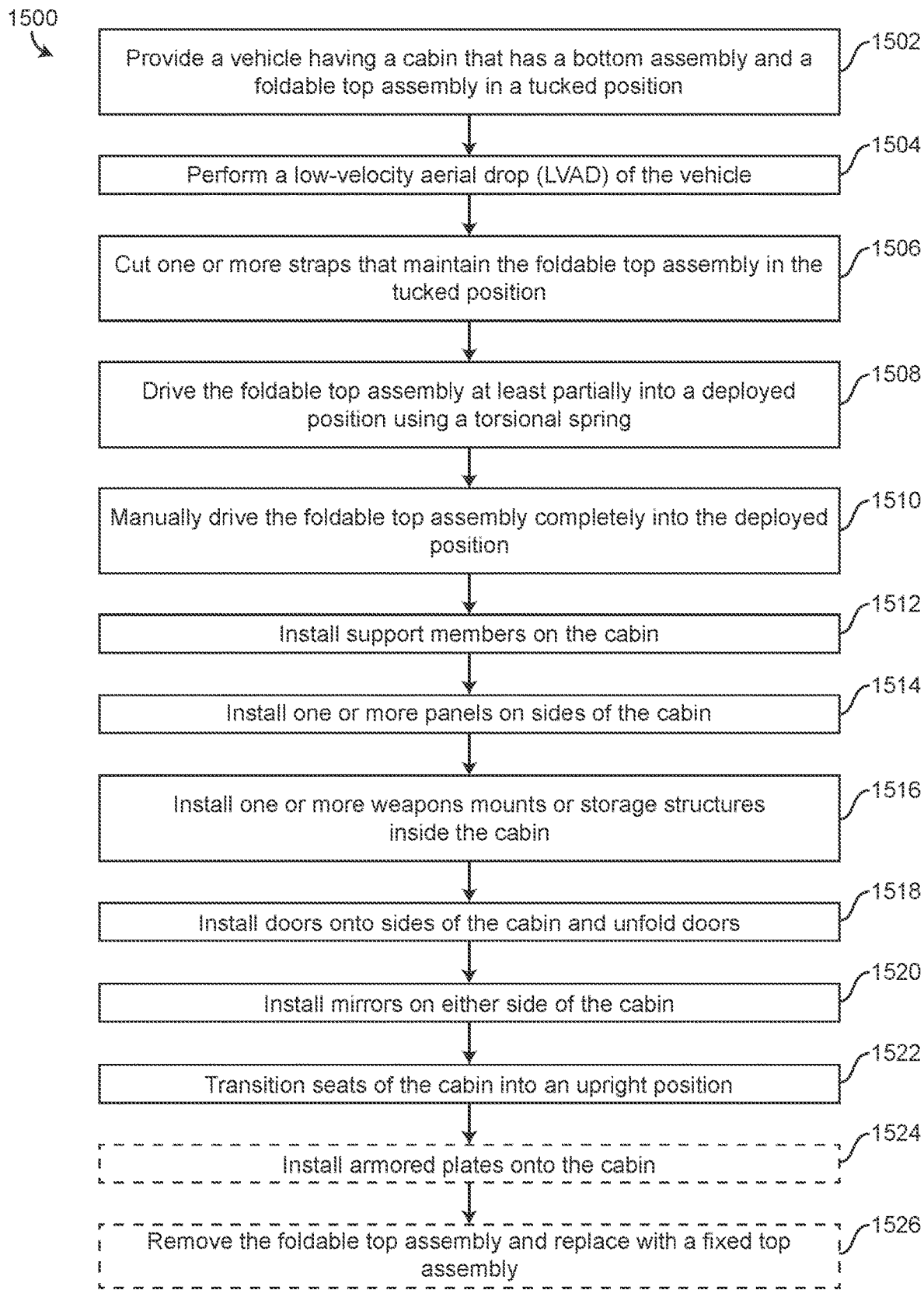
FIG. 36 is a flow diagram of a process for performing an aerial drop of a vehicle having a foldable cabin assembly, and for deploying the foldable cabin assembly.

Referring to FIG. 36, a flow diagram of a process 1500 for performing an LVAD using the vehicle 10 includes steps 1502-1522 and can be performed using the vehicle 10 and the foldable cabin 300 as described in greater detail above with reference to FIGS. 1-35. The foldable cabin 300 can include the foldable top assembly 308 to facilitate the performance of steps 1502-1522. Process 1500 illustrates the use of the foldable cabin 300 of the vehicle 10.

Process 1500 includes providing a vehicle having a cabin that has a bottom assembly and a foldable top assembly that is in a tucked position (step 1502), according to some embodiments. In some embodiments, the vehicle is the vehicle 10 and may be a military vehicle (e.g., an FMTVA2 vehicle). In some embodiments, the bottom assembly is a universal bottom assembly that is configured to couple with (e.g., removably) a fixed top assembly, a foldable top assembly, etc. The bottom assembly may be the bottom assembly 210, and the foldable top assembly may be the foldable top assembly 308.

Process 1500 includes performing a low-velocity aerial drop (LVAD) of the vehicle (step 1504), according to some embodiments. In some embodiments, the LVAD includes storing the vehicle in a cargo bay or hangar of an aircraft, and dropping the vehicle out of the aircraft with a parachute to a ground location. In some embodiments, the foldable top assembly of the cabin is in the folded, stowed, or tucked position when in the cargo bay or hangar of the aircraft and during the LVAD.

Process 1500 includes cutting one or more straps that maintain the foldable top assembly in the tucked position (step 1506), according to some embodiments. In some embodiments, step 1506 is performed once the LVAD has been performed and the vehicle has landed on the ground. Step 1506 may be performed by an operator or military personnel at the ground. Step 1506 can also include pulling a pin of a locking assembly (e.g., pulling the pin 502 of the locking assembly 500).

Process 1500 includes driving the foldable top assembly at least partially into a deployed position using a torsional spring (step 1508), according to some embodiments. In some embodiments, the step 1508 is performed by the torsion bar assembly 400 by providing a torque to the foldable top assembly to deploy the foldable top assembly. The foldable top assembly can form a linkage assembly (e.g., a 4-bar linkage) and the torque may be exerted to rotate the assembly to deploy or unfold the foldable top assembly. In some embodiments, step 1508 is performed autonomously or semi-autonomously once the straps are cut (e.g., once step 1506 is performed) and once the pin is pulled (e.g., once the pin 502 of the locking assembly 500 is pulled).

Process 1500 includes manually driving the foldable top assembly completely into the deployed position (step 1510), according to some embodiments. In some embodiments, the step 1510 is performed by an operator or military personnel by manually pushing the foldable top assembly into a completely upright or fully deployed position. In some embodiments, performing the step 1510 includes coupling a tool (e.g., a wrench) with an interface point of the foldable top assembly (e.g., the tool interface 408) and manually exerting a torque to fully deploy or unfold the foldable top assembly.

Figure 21:
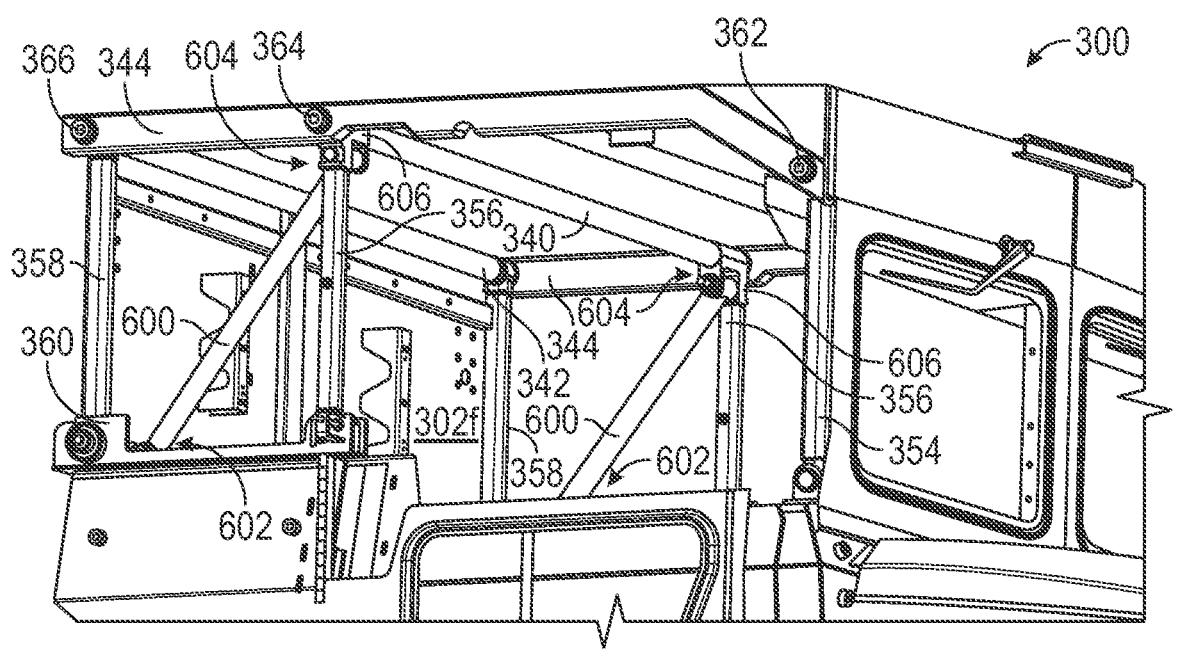
FIG. 21 is a perspective view of a portion of the foldable cabin of FIG. 8 showing the one or more support members.

Process 1500 includes installing support members on the cabin (step 1512), installing panels on sides of the cabin (step 1514), and installing one or more weapons mounts or storage structures inside the cabin (step 1516), according to some embodiments. In some embodiments, the step 1512 includes installing the support members 600 as shown in FIG. 21. In some embodiments, the step 1512 includes rotating the support members 600 up and pinning a second end with a corresponding mount to provide additional support for the foldable top assembly. In some embodiments, the step 1514 includes coupling the panels 700 and the front side panels 800 onto either side of the foldable top assembly. In some embodiments, the step 1516 includes installing the weapons mounts 900 on a rear wall of the cabin. In some embodiments, the step 1516 includes installing the shelving units 1000 on the rear wall or to hang from a roof of the cabin.

Process 1500 includes installing doors onto sides of the cabin and unfolding the doors (step 1518), installing mirrors on either side of the cabin (step 1520), and transitioning seats of the cabin into an upright position (step 1522), according to some embodiments. In some embodiments, step 1518 includes folding a hinged portion of the door (e.g., an upper portion of the door that is hingedly coupled with a bottom portion) upwards to seal in a corresponding opening. In some embodiments, the doors are pre-installed on the cabin and step 1518 includes unfolding the doors into a deployed position. In some embodiments, the step 1520 includes installing blindspot or rear view mirrors onto either side of the cabin of the vehicle (e.g., a driver side and a passenger side). In some embodiments, step 1522 includes unfolding the seats that are pre-installed in the cabin from a folded position to an unfolded position.

Process 1500 includes installing armored plates onto an exterior of the cabin (step 1524), according to some embodiments. In some embodiments, step 1524 is optional. The cabin may include appurtenances (e.g., appurtenances 104) that are configured to couple with various armored plates, bullet proof plates, explosion proof plates, reinforced plates, etc.

Process 1500 includes removing the foldable top assembly and replacing the foldable top assembly with a fixed top assembly (step 1526), according to some embodiments. In some embodiments, step 1526 includes removing the foldable top assembly (e.g., the foldable top assembly 308) and replacing the foldable top assembly with the removable top assembly 208. In some embodiments, any of steps 1520, 1524, or 1526 are performed after the vehicle has been transported to a ground hangar or base.

Figure 37:
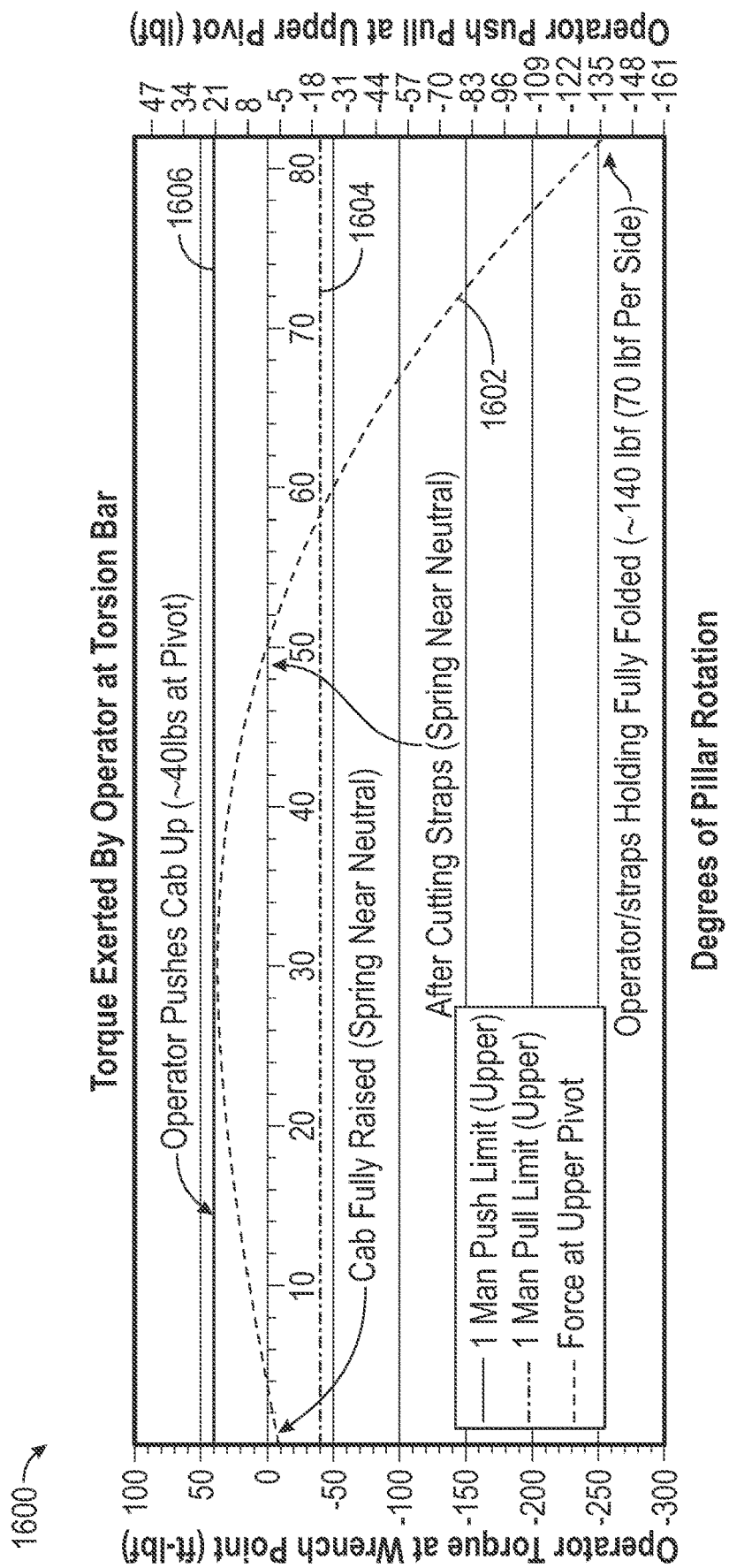
FIG. 37 is a graph showing torque exerted by the operator at the torsion bar assembly of the foldable cabin of FIG. 8.

Referring to FIG. 37, a graph 1600 includes a curve 1602 that illustrates an amount of torque exerted by an operator at the torsion bar assembly 400 in ft-lbf with respect to an angular orientation of the support members 354, 356, or 358. The graph 1600 also includes a boundary 1604 that illustrates a maximum amount of force in lbf that an operator can exert when pulling, and a boundary 1606 that illustrates a maximum amount of force in lbf that an operator can exert when pushing. As shown in FIG. 37, after cutting the straps, the torsion bar assembly 400 may exert a torque to rotate the support members to approximately 50 degrees. After this point, the operator may manually exert torque up to 40 ft-lbf (at approximately 30 degrees) until the foldable cab assembly 208 is fully raised (e.g., at 0 degrees). As shown in FIG. 37, the straps may hold the foldable cab assembly 208 in the folded position and may provide approximately 140 lbf of force total (e.g., 70 lbf of force on either side).

Advantageously, the foldable top assembly of the foldable cabin is semi-autonomously deployed. The foldable cabin facilitates reduced overall height of the vehicle for storage and aerial drop from an aircraft. The semi-autonomous foldability of the foldable cabin further facilitates rapid conversion of the vehicle from an LVAD mode to a usable mode (e.g., for transportation).

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A military vehicle comprising:
    a cabin comprising:
        a bottom assembly configured to receive and removably couple with a plurality of different top assemblies;
        a foldable top assembly configured to transition between a folded position for a low velocity aerial drop (LVAD) and a deployed position, wherein the foldable top assembly comprises a torsional spring configured to provide a torque to assist transitioning of the foldable top assembly from the folded position to the deployed position.

2. The military vehicle of claim 1, wherein the transitioning of the foldable top assembly from the folded position to the deployed position is manually initiated and the torsional spring is configured to provide the torque to transition the foldable top assembly at least partially out of the folded position.

3. The military vehicle of claim 1, wherein the foldable top assembly comprises:
    a torsional bar assembly comprising the torsional spring, wherein a housing of the torsional spring comprises an interface configured to couple with a tool to provide supplemental torque to manually transition the foldable top assembly fully into the deployed position.

4. The military vehicle of claim 1, wherein the torsional spring is configured to exert the torque between the bottom assembly and a rear wall of the foldable top assembly.

5. The military vehicle of claim 1, wherein the foldable top assembly comprises a plurality of support members rotatably coupled with the bottom assembly at a first end and rotatably coupled with a roof of the foldable top assembly at a second end.

6. The military vehicle of claim 5, wherein the plurality of support members, the roof of the foldable top assembly, and the bottom assembly form a four-bar linkage.

7. The military vehicle of claim 5, wherein the plurality of support members comprise an end having a shoulder configured to abut a portion or member of the foldable top assembly that is configured to couple with the bottom assembly, the shoulder defining a flat surface, wherein the flat surface and the shoulder are configured to limit further rotation of the plurality of support members beyond an angular position of the plurality of support members when the foldable top assembly is in the deployed position.

8. A foldable cabin assembly for a military vehicle, the foldable cabin assembly comprising:
 a bottom frame assembly configured to rest upon and removably couple with a bottom assembly of the military vehicle;
 a roof;
 a plurality of elongated members extending between the bottom frame assembly and the roof, the plurality of elongated members rotatably coupled with the bottom frame assembly and the roof at opposite ends; and
 a torsion bar assembly configured to exert a torque on at least one of the plurality of elongated members to facilitate transitioning the foldable cabin assembly from a folded position to a deployed position by rotating the plurality of elongated members in a rotational direction.

9. The foldable cabin assembly of claim 8, wherein at least one of the plurality of elongated members comprises an end having a shoulder configured to abut a top surface of the bottom frame assembly, the shoulder defining a flat surface, wherein the flat surface and the shoulder are configured to limit further rotation of the plurality of elongated members beyond an angular position of the plurality of elongated members when the foldable cabin assembly is in the deployed position.

10. The foldable cabin assembly of claim 9, wherein the angular position of the plurality of elongated members when the foldable cabin assembly is in the deployed position is a second angular position, wherein the at least one of the plurality of elongated members that includes the shoulder is selectably pinned in a first angular position when the foldable cabin assembly is in the folded position, and the second angular position when the foldable cabin assembly is in the deployed position.

11. The foldable cabin assembly of claim 8, wherein the bottom frame assembly, the roof, and the plurality of elongated members form a four-bar linkage.

12. The foldable cabin assembly of claim 8, wherein the plurality of elongated members are configured to extend in a vertical direction when in the deployed position.

13. The foldable cabin assembly of claim 8, wherein the torsion bar assembly is configured to automatically drive the plurality of elongated members to rotate to a position between the folded position and the deployed position responsive to initiation of transition of the foldable cabin assembly from the folded position to the deployed position, wherein the torsion bar assembly is configured to provide additional torque to aid a manually input torque resulting from a manual force applied to the plurality of elongated members, wherein the manual force required to be applied to the plurality of elongated members to fully transition the foldable cabin assembly into the deployed position does not exceed 40 lbf.

14. The foldable cabin assembly of claim 8, wherein the plurality of elongated members are configured to rotate at least 80 degrees between the folded position and the deployed position of the foldable cabin assembly.

15. The foldable cabin assembly of claim 8, further comprising a plurality of support members each having a first end and a second end, the plurality of support members rotatably coupled at their first ends with the bottom frame assembly, wherein the plurality of support members are configured to be rotated into position and fixedly coupled at their second ends with the roof or an upper end of the plurality of elongated members that couples with the roof when the foldable cabin assembly is in the deployed position, the plurality of support members configured to provide structural support for the roof and limit transition of the foldable cabin assembly out of the deployed position when fixedly coupled at their second ends with the roof or the upper end of the plurality of elongated members.

16. The foldable cabin assembly of claim 8, wherein a housing of a torsional spring of the torsion bar assembly comprises an interface configured to couple with a tool to provide torque to manually transition the foldable cabin assembly fully into the deployed position.

17. The foldable cabin assembly of claim 8, wherein at least one of the roof, the bottom frame assembly, or the plurality of elongated members are configured to receive and couple with a plurality of panels when the foldable cabin assembly is in the deployed position.

18. The foldable cabin assembly of claim 8, wherein at least one of the roof, the bottom frame assembly, or the plurality of elongated members are configured to receive and couple with a plurality of weapons mounts or shelving units when the foldable cabin assembly is in the deployed position.

19. A method for delivering and configuring a military vehicle for use, the method comprising:
 performing a low velocity aerial drop (LVAD) of the military vehicle from an airborne aircraft to physically drop the military vehicle to a ground location, the military vehicle comprising a foldable cabin assembly, wherein the foldable cabin assembly is in a folded position when transported in the airborne aircraft and when physically dropped to the ground location;
 driving the foldable cabin assembly into a position partially between the folded position and a deployed position by providing a torque with a torsional spring;
 providing a force that is less than 40 lbf to the foldable cabin assembly to manually drive the foldable cabin assembly into the deployed position, the torsional spring providing assisting torque to reduce the force required to manually dive the foldable cabin assembly into the deployed position, wherein a pin of a first support member of the foldable cabin assembly is configured to be driven into an opening of the foldable cabin assembly to lock the foldable cabin assembly in the deployed position;
 installing a second support member onto the foldable cabin assembly to limit transition of the foldable cabin assembly out of the deployed position and into the folded position; and installing panels, armored plates, doors, and mirrors onto the foldable cabin assembly.

\* \* \* \* \*